(12) United States Patent
Kaga

(10) Patent No.: US 7,089,106 B2
(45) Date of Patent: Aug. 8, 2006

(54) IN-CYLINDER AIR AMOUNT ESTIMATION APPARATUS FOR AN INTERNAL COMBUSTION ENGINE AND ESTIMATION METHOD THEREOF

(75) Inventor: Tomoyuki Kaga, Lafayette, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 7 days.

(21) Appl. No.: 11/067,667

(22) Filed: Feb. 28, 2005

(65) Prior Publication Data

US 2005/0197760 A1    Sep. 8, 2005

(30) Foreign Application Priority Data

Mar. 5, 2004    (JP)    ............................. 2004-062821
Dec. 3, 2004    (JP)    ............................. 2004-351429

(51) Int. Cl.
G06F 17/00    (2006.01)
G01M 19/00    (2006.01)
F02D 41/14    (2006.01)

(52) U.S. Cl. ..................................... 701/103; 73/118.2
(58) Field of Classification Search ................ 701/102, 701/103, 114; 123/568.14, 568.21; 73/117.3, 73/118.1, 118.2
See application file for complete search history.

(56) References Cited

U.S. PATENT DOCUMENTS 6,460,409 B1 * 10/2002 Soliman et al. ............ 73/118.2
6,662,640 B1 * 12/2003 Yagi .......................... 73/118.2

FOREIGN PATENT DOCUMENTS

JP    (A) 2001-234798    8/2001
JP    (A) 2002-070633    3/2002

* cited by examiner

Primary Examiner—Hieu T. Vo
(74) Attorney, Agent, or Firm—Kenyon & Kenyon LLP

(57) ABSTRACT

In an in-cylinder air amount estimation apparatus and an estimation method thereof, an average value of a pressure reduction amount that is an amount of reduction in a pressure in an intake pipe in plural opening/closing cycles is employed as a pressure reduction amount for calculating an excess air amount that is considered when an in-cylinder air amount is estimated, in order to suppress a decrease in accuracy. When it is determined that a ratio of a length of a pulsation cycle of the pressure in the intake pipe to a length of the sampling cycle is less than a predetermined level, the average value is obtained using an averaging method with high accuracy as compared to an ordinary method.

16 Claims, 19 Drawing Sheets mt: FLOW RATE OF AIR FLOWING INTO AN INTAKE PIPE (g/sec)
mci: FLOW RATE OF AIR FLOWING OUT TO EACH CYLINDER FROM INTAKE PIPE (g/sec)
Pm: INTAKE PIPE PRESSURE (Pa)
Tm: INTAKE PIPE TEMPERATURE (° K)
Ra: CONSTANT RELATING TO GAS CONSTANT
Vm: VOLUME OF INTAKE PIPE (m³)

IN-CYLINDER AIR AMOUNT ESTIMATION APPARATUS FOR AN INTERNAL COMBUSTION ENGINE AND ESTIMATION METHOD THEREOF

INCORPORATED BY REFERENCE

The disclosure of Japanese Patent Applications No. 2004-062821 filed on Mar. 5, 2004, and No. 2004-351429 filed on Dec. 3, 2004, including the specifications, drawings and abstracts is incorporated herein by reference in its entirety.

BACKGROUND OF THE INVENTION

1. Field of the Invention

The invention relates to an in-cylinder air amount estimation apparatus for an internal combustion engine, and an estimation method thereof.

2. Description of the Related Art

In an internal combustion engine, operation control such as fuel injection amount control is performed based on an amount of air in a cylinder when an intake valve is in a closed state (hereinafter, referred to as "in-cylinder air amount"). Therefore, it is important to accurately estimate the in-cylinder air amount in order to appropriately perform the operation control.

Accordingly, for example, Japanese Patent Laid-Open Publication No. 2001-234798 discloses a technology in which intake efficiency in each cylinder is estimated, and the intake efficiency is used to estimate an in-cylinder air amount in a corresponding cylinder. In this case, even if the intake efficiency varies with each cylinder due to, for example, adherence of deposits in an intake system of an internal combustion engine, or deviation of components caused when assembled, and therefore the in-cylinder air amount varies with each cylinder, the in-cylinder air amount can be estimated considering the variation.

Meanwhile, in the internal combustion engine, intake valves of the cylinders are sequentially opened, which causes pulsation of a pressure in an intake pipe. This pulsation of the pressure in the intake pipe is closely related to the in-cylinder air amount in each cylinder. However, in the technology disclosed in the Japanese Patent Laid-Open Publication No. 2001-234798, the aforementioned pulsation is not considered when the in-cylinder air amount in each cylinder is estimated. Therefore, the estimated in-cylinder air amount in each cylinder becomes inaccurate due to influence of the aforementioned pulsation.

SUMMARY OF THE INVENTION

In view of the above, it is an object of the invention to provide an in-cylinder air amount estimation apparatus for an internal combustion engine, and an estimation method thereof, which can estimate an in-cylinder air amount more accurately considering influence of pulsation of a pressure in an intake pipe.

An aspect of the invention relates to an in-cylinder air amount estimation apparatus which is applied to an internal combustion engine where pulsation of a pressure occurs in an intake pipe due to opening/closing of an intake valve, and which calculates an inflow air amount that is an amount of air flowing into the intake pipe, and estimates an in-cylinder air amount using the inflow air amount. The in-cylinder air amount estimation apparatus includes a reduction amount calculation device which performs quantization of an output of a pressure sensor for detecting the pressure in the intake pipe using analogue to digital conversion in a predetermined sampling cycle, and calculates a pressure reduction amount that is an amount of reduction in the pressure in the intake pipe due to opening of the intake valve using a value obtained by the quantization as the pressure in the intake pipe; an excess air amount calculation device which calculates an excess air amount that is an amount of air charged into a cylinder due to the pulsation of the pressure, based on the pressure reduction amount; and an in-cylinder air amount estimation device which estimates the in-cylinder air amount based on the inflow air amount and the excess air amount. The reduction amount calculation device calculates, as the pressure reduction amount for calculating the excess air amount, an average value of the pressure reduction amount in plural opening/closing cycles of the intake valve; and the reduction amount calculation device obtains the average value of the pressure reduction amount using an averaging method with high accuracy in a case where a ratio of a length of a pulsation cycle of the pressure to a length of the sampling cycle for the analogue to digital conversion is less than a predetermined level, as compared to a case where the ratio of the length of the pulsation cycle of the pressure to the length of the sampling cycle for the analogue to digital conversion is equal to or greater than the predetermined level.

Another aspect of the invention relates to an in-cylinder air amount estimation method which is applied to an internal combustion engine where pulsation of a pressure occurs in an intake pipe due to opening/closing of an intake valve, and in which an inflow air amount that is an amount of air flowing into the intake pipe is calculated, and an in-cylinder air amount is estimated using the inflow air amount. The in-cylinder air amount estimation method includes the steps of performing quantization of an output of a pressure sensor for detecting the pressure in the intake pipe using analogue to digital conversion in a predetermined sampling cycle, and calculating a pressure reduction amount that is an amount of reduction in the pressure in the intake pipe due to opening of the intake valve using a value obtained by the quantization as the pressure in the intake pipe, wherein an average value of the pressure reduction amount in plural opening/closing cycles of the intake valve is calculated as the pressure reduction amount for calculating the excess air amount, and the average value of the pressure reduction amount is obtained using an averaging method with high accuracy in a case where a ratio of a length of a pulsation cycle of the pressure to a length of the sampling cycle for the analogue to digital conversion is less than a predetermined level, as compared to a case where the ratio of the length of the pulsation cycle of the pressure to the length of the sampling cycle for the analogue to digital conversion is equal to or greater than the predetermined level; calculating an excess air amount that is an amount of air charged into a cylinder due to the pulsation of the pressure, based on the pressure reduction amount; and estimating the in-cylinder air amount based on the inflow air amount and the excess air amount.

In the aforementioned in-cylinder air amount estimation apparatus and the in-cylinder air amount estimation method, the in-cylinder air amount is estimated considering the amount of air charged into the cylinder due to the pulsation of the pressure in the intake pipe caused by opening/closing of the intake valve, that is, the excess air amount. Therefore, it is possible to obtain the accurate in-cylinder air amount estimated considering influence of the pulsation.

Also, the pressure reduction amount that is the amount of reduction in the pressure in the intake pipe due to opening of the intake valve is calculated by performing quantization of the output of the pressure sensor using the analogue to digital conversion in the predetermined sampling cycle, and using the value obtained by the quantization as the pressure in the intake pipe. However, since the accuracy of the pressure obtained using the analogue to digital conversion is decreased due to an error in the quantization or noise, the accuracy of the pressure reduction amount for calculating the excess air amount is also decreased. Therefore, as the pressure reduction amount for calculating the excess air amount, the average value of the pressure reduction amount in the plural opening/closing cycles of the intake valve is employed, whereby a decrease in the accuracy of the pressure reduction amount is suppressed.

Meanwhile, in a case where the pulsation cycle of the pressure in the intake pipe is changed due to a change in an opening/closing mode of the intake valve, or the like, and the length of the pulsation cycle becomes close to the length of the sampling cycle for the analogue to digital conversion, the number of times of performing sampling for the analogue to digital conversion in one opening/closing cycle of the intake valve is decreased. As a result of the decrease in the number of times of performing sampling, the maximum value and the minimum value of the pressure obtained by performing quantization while the intake valve is in an opened state become greatly different from the maximum value and the minimum value of an actual pressure. Therefore, it becomes difficult to obtain necessary accuracy of the pressure reduction amount which is a difference between the maximum value and the minimum value of the pressure. Accordingly, it is conceivable to obtain the pressure reduction amount for calculating the excess air amount, which is the average value of the pressure reduction amount, using the averaging method with higher accuracy so as to ensure necessary accuracy of the pressure reduction amount for calculating the excess air amount. However, when using such an averaging method with high accuracy, a calculation load is increased, and an amount of used memory is increased.

Accordingly, in the in-cylinder air amount estimation apparatus thus configured and the estimation method thereof, only in the case where the the ratio of the length of the pulsation cycle of the pressure to the length of the sampling cycle is less than the predetermined level, the average value of the pressure reduction amount that is the pressure reduction amount for calculating the excess air amount is obtained using the averaging method with high accuracy. In the case where the ratio of the length of the pulsation cycle of the pressure to the length of the sampling cycle is equal to or greater than the predetermined level, the average value of the pressure reduction amount that is the pressure reduction amount for calculating the excess air amount is obtained using an averaging method in which a calculation load is small and a small amount of memory is used, as compared to the averaging method with high accuracy.

Another aspect of the invention relates to an in-cylinder air amount estimation apparatus which is applied to an internal combustion engine where pulsation of a pressure occurs in an intake pipe due to opening/closing of an intake valve, and which calculates an inflow air amount that is an amount of air flowing into the intake pipe, and estimates an in-cylinder air amount using the inflow air amount. The in-cylinder air amount estimation apparatus includes a reduction amount calculation device which performs quantization of an output of a pressure sensor for detecting the pressure in the intake pipe using analogue to digital conversion in a predetermined sampling cycle, and calculates a pressure reduction amount that is an amount of reduction in the pressure in the intake pipe due to opening of the intake valve using a value obtained by the quantization as the pressure in the intake pipe; an excess air amount calculation device which calculates an excess air amount that is an amount of air charged into a cylinder due to the pulsation of the pressure, based on the pressure reduction amount; and an in-cylinder air amount estimation device which estimates the in-cylinder air amount based on the inflow air amount and the excess air amount. The reduction amount calculation device calculates, as the pressure reduction amount for calculating the excess air amount, an average value of the pressure reduction amount in plural opening/closing cycles of the intake valve; and the reduction amount calculation device changes a number of times of repeating the opening/closing cycle for obtaining the average value of the pressure reduction amount according to a ratio of a length of a pulsation cycle of the pressure to a length of the sampling cycle for the analogue to digital conversion.

Another aspect of the invention relates to an in-cylinder air amount estimation method which is applied to an internal combustion engine where pulsation of a pressure occurs in an intake pipe due to opening/closing of an intake valve, and in which an inflow air amount that is an amount of air flowing into the intake pipe is calculated, and an in-cylinder air amount is estimated using the inflow air amount. The in-cylinder air amount estimation method includes the steps of performing quantization of an output of a pressure sensor for detecting the pressure in the intake pipe using analogue to digital conversion in a predetermined sampling cycle, and calculating a pressure reduction amount that is an amount of reduction in the pressure in the intake pipe due to opening of the intake valve using a value obtained by the quantization as the pressure in the intake pipe, wherein an average value of the pressure reduction amount in plural opening/closing cycles of the intake valve is calculated as the pressure reduction amount for calculating the excess air amount, and a number of times of repeating the opening/closing cycle for obtaining the average value of the pressure reduction amount is changed according to a ratio of a length of a pulsation cycle of the pressure to a length of the sampling cycle for the analogue to digital conversion; calculating an excess air amount that is an amount of air charged into a cylinder due to the pulsation of the pressure, based on the pressure reduction amount; and estimating the in-cylinder air amount based on the inflow air amount and the excess air amount.

In the in-cylinder air amount estimation apparatus thus configured and the estimation method thereof, the in-cylinder air amount is estimated considering the amount of air charged into the cylinder due to the pulsation of the pressure in the intake pipe caused by opening/closing of the intake valve, that is the excess air amount. Therefore, it is possible to obtain the accurate in-cylinder air amount estimated considering influence of the pulsation.

Also, the pressure reduction amount that is the amount of reduction in the pressure in the intake pipe due to opening of the intake valve is calculated by performing quantization of the output of the pressure sensor using the analogue to digital conversion in the predetermined sampling cycle, and using the value obtained by the quantization as the pressure in the intake pipe. However, since the accuracy of the pressure obtained using the analogue to digital conversion is decreased due to an error in the quantization or noise, the accuracy of the pressure reduction amount for calculating the excess air amount is also decreased. Therefore, as the pressure reduction amount for calculating the excess air amount, the average value of the pressure reduction amount in the plural opening/closing cycles of the intake valve is employed, whereby a decrease in the accuracy of the pressure reduction amount is suppressed.

Meanwhile, in a case where the pulsation cycle of the pressure in the intake pipe is changed due to a change in an opening/closing mode of the intake valve, or the like, and the length of the pulsation cycle becomes close to the length of the sampling cycle for the analogue to digital conversion, the number of times of performing sampling for the analogue to digital conversion in one opening/closing cycle of the intake valve is decreased. As a result of the decrease in the number of times of performing sampling, the maximum value and the minimum value of the pressure obtained by performing quantization while the intake valve is in an opened state become greatly different from the maximum value and the minimum value of the actual pressure. Therefore, it becomes difficult to obtain necessary accuracy of the pressure reduction amount which is a difference between the maximum value and the minimum value of the pressure. Accordingly, it is conceivable to set the number of times of repeating the opening/closing cycle for obtaining the average value of the pressure reduction amount to a large value so as to ensure necessary accuracy of the pressure reduction amount. However, as the number of times of repeating the opening/closing cycle is increased, the calculation load for calculating the average value of the pressure reduction amount is increased, and the amount of used memory is increased.

In the in-cylinder air amount estimation apparatus thus configured and the estimation method thereof, the number of times of repeating the opening/closing cycle for obtaining the average value of the pressure reduction amount can be changed according to the ratio of the length of the pulsation cycle of the pressure to the length of the sampling cycle for the analogue to digital conversion. However, as the number of times of repeating the opening/closing cycle is increased, the calculation load for calculating the average value of the pressure reduction amount is increased, and the amount of used memory is increased since data used for the calculation needs to be stored, as described above. Considering this, the number of times of repeating the opening/closing cycle is increased only in the case where the ratio of the length of the pulsation cycle of the pressure to the length of the sampling cycle is less than the predetermined level. Thus, it is possible to ensure necessary accuracy of the pressure reduction amount for calculating the excess air amount, and to minimize the increase in the calculation load and the increase in the amount of used memory.

Another aspect of the invention relates to an in-cylinder air amount estimation apparatus which is applied to an internal combustion engine where pulsation of a pressure occurs in an intake pipe due to opening/closing of an intake valve, and which calculates an inflow air amount that is an amount of air flowing into the intake pipe, and estimates an in-cylinder air amount using the inflow air amount. The in-cylinder air amount estimation apparatus includes a reduction amount calculation device which performs quantization of an output of a pressure sensor for detecting the pressure in the intake pipe using analogue to digital conversion in a predetermined sampling cycle, and calculates a pressure reduction amount that is an amount of reduction in the pressure in the intake pipe due to opening of the intake valve using a value obtained by the quantization as the pressure in the intake pipe; an excess air amount calculation device which calculates an excess air amount that is an amount of air charged into a cylinder due to the pulsation of the pressure, based on the pressure reduction amount; and an in-cylinder air amount estimation device which estimates the in-cylinder air amount based on the inflow air amount and the excess air amount. The reduction amount calculation device calculates, as the pressure reduction amount for calculating the excess air amount, an average value of the pressure reduction amount in plural opening/closing cycles of the intake valve; and the reduction amount calculation device changes a length of the sampling cycle for the analogue to digital conversion according to a ratio of a length of a pulsation cycle of the pressure to a length of the sampling cycle.

Another aspect of the invention relates to an in-cylinder air amount estimation method which is applied to an internal combustion engine where pulsation of a pressure occurs in an intake pipe due to opening/closing of an intake valve, and in which an inflow air amount that is an amount of air flowing into the intake pipe is calculated, and an in-cylinder air amount is estimated using the inflow air amount. The in-cylinder air amount estimation method includes the steps of performing quantization of an output of a pressure sensor for detecting the pressure in the intake pipe using analogue to digital conversion in a predetermined sampling cycle, and calculating a pressure reduction amount that is an amount of reduction in the pressure in the intake pipe due to opening of the intake valve using a value obtained by the quantization as the pressure in the intake pipe, wherein an average value of the pressure reduction amount in plural opening/closing cycles of the intake valve is calculated as the pressure reduction amount for calculating the excess air amount, and a length of the sampling cycle for the analogue to digital conversion is changed according to a ratio of a length of a pulsation cycle of the pressure to a length of the sampling cycle; calculating an excess air amount that is an amount of air charged into a cylinder due to the pulsation of the pressure, based on the pressure reduction amount; and estimating the in-cylinder air amount based on the inflow air amount and the excess air amount.

In the in-cylinder air amount estimation apparatus thus configured and the estimation method thereof, the in-cylinder air amount is estimated considering the amount of air charged into the cylinder due to the pulsation of the pressure in the intake pipe caused by opening/closing of the intake valve. Therefore, it is possible to obtain the accurate in-cylinder air amount estimated considering influence of the pulsation.

Also, the pressure reduction amount in the intake pipe due to opening of the intake valve is calculated by performing quantization of the output of the pressure sensor using the analogue to digital conversion in the predetermined sampling cycle, and using the value obtained by the quantization as the pressure in the intake pipe. However, since the accuracy of the pressure obtained using the analogue to digital conversion is decreased due to an error in the quantization or noise, the accuracy of the pressure reduction amount for calculating the excess air amount is also decreased. Therefore, as the pressure reduction amount for calculating the excess air amount, the average value of the pressure reduction amount in the plural opening/closing cycles of the intake valve is employed, whereby a decrease in the accuracy of the pressure reduction amount is suppressed.

Meanwhile, the accuracy of the pressure reduction amount for calculating the excess air amount is greatly influenced by a change in the pulsation cycle of the pressure in the intake pipe due to a change in an opening/closing mode of the intake valve, or the like. For example, when the length of the pulsation cycle becomes close to the length of the sampling cycle for the analogue to digital conversion, the number of times of performing sampling for the analogue to digital conversion in one opening/closing cycle of the intake valve is decreased. As a result of the decrease in the number of times of performing sampling, the maximum value and the minimum value of the pressure obtained by performing quantization while the intake valve is in an opened state become greatly different from the maximum value and the minimum value of the actual pressure. Therefore, it becomes difficult to obtain necessary accuracy of the pressure reduction amount which is the difference between the maximum value and the minimum value of the pressure.

Ordinarily, the change in the pressure in the intake pipe (intake pipe pressure) obtained by performing quantization in the predetermined sampling cycle differs from one opening/closing cycle of the intake valve to another cycle (i.e., a waveform of the change in the intake pipe pressure during each opening/closing cycle becomes non-uniform while the opening/closing cycle is repeated plural times), since the waveform of the output of the pressure sensor differs from one opening/closing cycle to another. However, the waveform of the change in the intake pipe pressure during each opening/closing cycle may become uniform while the opening/closing cycle is repeated plural times, irrespective of the difference in the waveform of the output of the pressure sensor from one opening/closing cycle to another. In other words, no matter how long the length of the sampling cycle is, there is a length of the pulsation cycle which makes the waveform of the change in the intake pipe pressure during each opening/closing cycle uniform while the opening/closing cycle is repeated plural times, irrespective of the difference in the waveform of the output of the pressure sensor from one opening/closing cycle to another. In a case where the waveform of the change in the intake pipe pressure during each opening/closing cycle is uniform while the opening/closing cycle is repeated plural times, it is difficult to ensure necessary accuracy of the average value of the pressure reduction amount as the pressure reduction amount for calculating the excess air amount, even if the average value is obtained by averaging the pressure reduction amounts in the plural opening/closing cycles.

In the in-cylinder air amount estimation apparatus thus configured and the estimation method thereof, the length of the sampling cycle can be changed according to the ratio of the length of the pulsation cycle of the pressure to the length of the sampling cycle for the analogue to digital conversion. Therefore, the length of the sampling cycle can be changed so as to prevent the aforementioned situation from occurring. That is, the length of the sampling cycle can be changed such that the length of the pulsation cycle, which is changed according to the opened/closed state of the intake valve, is prevented from becoming excessively close to the length of the sampling cycle, and the ratio of the length of the pulsation cycle to the length of the sampling cycle does not make the waveform of the change in the pressure during each opening/closing cycle of the intake valve uniform while the opening/closing cycle is repeated plural times. Since the sampling cycle is changed in this manner, it is possible to ensure necessary accuracy of the pressure reduction amount for calculating the excess air amount, even under the aforementioned situation.

Another aspect of the invention relates to an in-cylinder air amount estimation apparatus which is applied to an internal combustion engine where pulsation of a pressure occurs in an intake pipe due to opening/closing of an intake valve, and which calculates an inflow air amount that is an amount of air flowing into the intake pipe, and estimates an in-cylinder air amount using the inflow air amount. The in-cylinder air amount estimation apparatus includes a reduction amount calculation device which performs quantization of an output of a pressure sensor for detecting the pressure in the intake pipe using analogue to digital conversion in a predetermined sampling cycle, and calculates a pressure reduction amount that is an amount of reduction in the pressure in the intake pipe due to opening of the intake valve using a value obtained by the quantization as the pressure in the intake pipe; an excess air amount calculation device which calculates an excess air amount that is an amount of air charged into a cylinder due to the pulsation of the pressure, based on the pressure reduction amount; and an in-cylinder air amount estimation device which estimates the in-cylinder air amount based on the inflow air amount and the excess air amount. The reduction amount calculation device calculates, as the pressure reduction amount for calculating the excess air amount, an average value of the pressure reduction amount in plural opening/closing cycles of the intake valve; and the reduction amount calculation device does not calculate the pressure reduction amount in the intake pipe in a present opening/closing cycle when it is determined that a difference of a length of a pulsation cycle of the pressure to a length of the sampling cycle for the analogue to digital conversion is a value which makes a waveform of a change in the pressure in the intake pipe obtained by the quantization during each opening/closing cycle of the intake valve uniform.

Another aspect of the invention relates to an in-cylinder air amount estimation method which is applied to an internal combustion engine where pulsation of a pressure occurs in an intake pipe due to opening/closing of an intake valve, and in which an inflow air amount that is an amount of air flowing into the intake pipe is calculated, and an in-cylinder air amount is estimated using the inflow air amount. The in-cylinder air amount estimation method includes the steps of performing quantization of an output of a pressure sensor for detecting the pressure in the intake pipe using analogue to digital conversion in a predetermined sampling cycle, and calculating a pressure reduction amount that is an amount of reduction in the pressure in the intake pipe due to opening of the intake valve using a value obtained by the quantization as the pressure in the intake pipe, wherein an average value of the pressure reduction amount in plural opening/closing cycles of the intake valve is calculated as the pressure reduction amount for calculating the excess air amount, and the pressure reduction amount in the intake pipe in a present opening/closing cycle is not calculated when it is determined that a ratio of a length of a pulsation cycle of the pressure to a length of the sampling cycle for the analogue to digital conversion is a value which makes a waveform of a change in the pressure in the intake pipe obtained by the quantization during each opening/closing cycle of the intake valve uniform; calculating an excess air amount that is an amount of air charged into a cylinder due to the pulsation of the pressure, based on the pressure reduction amount; and estimating the in-cylinder air amount based on the inflow air amount and the excess air amount.

In the in-cylinder air amount estimation apparatus thus configured and the estimation method thereof, the in-cylinder air amount is estimated considering the amount of air charged into the cylinder due to the pulsation of the pressure in the intake pipe caused by opening/closing of the intake valve. Therefore, it is possible to obtain the accurate in-cylinder air amount estimated considering influence of the pulsation.

Also, the pressure reduction amount in the intake pipe due to opening of the intake valve is calculated by performing quantization of the output of the pressure sensor using the analogue to digital conversion in the predetermined sampling cycle, and using the value obtained by the quantization as the pressure in the intake pipe. However, since the accuracy of the pressure obtained using the analogue to digital conversion is decreased due to an error in the quantization or noise, the accuracy of the pressure reduction amount for calculating the excess air amount is also decreased. Therefore, as the pressure reduction amount for calculating the excess air amount, the average value of the pressure reduction amount in the plural opening/closing cycles of the intake valve is employed, whereby a decrease in the accuracy of the pressure reduction amount is suppressed.

Ordinarily, the change in the intake pipe pressure obtained by performing quantization in the predetermined sampling cycle differs from one opening/closing cycle of the intake valve to another cycle (i.e., a waveform of the change in the intake pipe pressure during each opening/closing cycle becomes non-uniform while the opening/closing cycle is repeated plural times), since the waveform of the output of the pressure sensor differs from one opening/closing cycle to another. However, the waveform of the change in the intake pipe pressure during each opening/closing cycle may become uniform while the opening/closing cycle is repeated plural times, irrespective of the difference in the waveform of the output of the pressure sensor from one opening/closing cycle to another. In other words, no matter how long the length of the sampling cycle is, there is a length of the pulsation cycle which makes the waveform of the change in the intake pipe pressure during each opening/closing cycle uniform while the opening/closing cycle is repeated plural times, irrespective of the difference in the waveform of the output of the pressure sensor from one opening/closing cycle to another. In a case where the waveform of the change in the intake pipe pressure during each opening/closing cycle is uniform while the opening/closing cycle of the intake valve is repeated plural times, it is difficult to ensure necessary accuracy of the average value of the pressure reduction amount as the pressure reduction amount for calculating the excess air amount, even if the average value is obtained by averaging the pressure reduction amounts in the plural opening/closing cycles.

In the in-cylinder air amount estimation apparatus thus configured and the estimation method thereof, under the aforementioned situation, the pressure reduction amount that is the amount of reduction in the pressure in the intake pipe in the present opening/closing cycle is not calculated. In this case, the average value of the pressure reduction amount is obtained by averaging the pressure reduction amounts in the plural opening/closing cycles, exclusive of the pressure reduction amount in the present opening/closing cycle. Then, the average value is used as the pressure reduction amount for calculating the excess air amount. Accordingly, when averaging the pressure reduction amounts to obtain the pressure reduction amount for calculating the excess air amount, the pressure reduction amount in the present opening/closing cycle is not used when the waveform of the change in the pressure during each opening/closing cycle becomes uniform. Therefore, it is possible to reduce the possibility that it becomes difficult to ensure necessary accuracy of the pressure reduction amount.

BRIEF DESCRIPTION OF THE DRAWINGS

The above mentioned embodiment and other embodiments, objects, features, advantages, technical and industrial significance of this invention will be better understood by reading the following detailed description of the exemplary embodiments of the invention, when considered in connection with the accompanying drawings, in which.

DETAILED DESCRIPTION OF THE EXEMPLARY EMBODIMENTS

Hereinafter, description will be made of a first embodiment in which the invention is applied to an in-cylinder injection spark ignition type four-cylinder engine installed in an automobile, with reference to FIG. 1 to FIG. 10.

Figure 1:
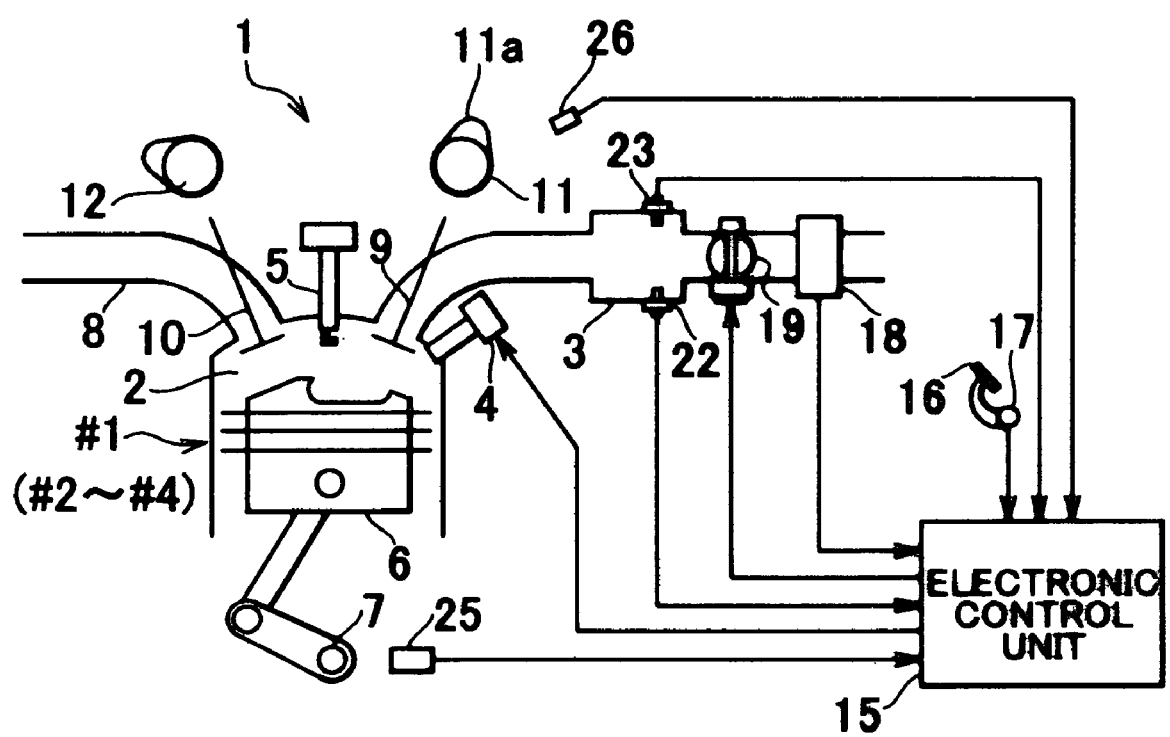
FIG. 1 is a schematic diagram showing an entire in-line four-cylinder engine to which an in-cylinder air amount estimation apparatus according to a first embodiment of the invention is applied.

As shown in FIG. 1, in an engine 1, air is taken into a combustion chamber 2 of each of cylinders #1 to #4 (only a cylinder #1 is shown) through an intake pipe 3, and fuel is injected directly to each chamber 2 from a fuel injection valve 4. When an air-fuel mixture composed of the air and fuel is ignited by an ignition plug 5, the air-fuel mixture is burned, and a piston 6 is reciprocated, whereby a crank shaft 7 that is an output shaft of the engine 1 is rotated. Then, after the air-fuel mixture is burned, exhaust gas is discharged from each combustion chamber 2 to an exhaust pipe 8.

An output of the engine 1 is adjusted through depression operation of an accelerator pedal 16 performed by a driver of the automobile. That is, when the accelerator pedal 16 is depressed, an opening degree of a throttle valve 19 is adjusted according to a depression amount of the accelerator pedal 16, and an amount of air flowing into an intake pipe 3 is changed. Then, fuel whose amount corresponds to an amount of air taken into the combustion chamber 2 is injected from the fuel injection valve 4. Thus, an amount of air-fuel mixture charged into the combustion chamber 2 is changed, whereby the output of the engine 1 is adjusted.

In the engine 1, communication between the combustion chamber 2 and the intake pipe 3 is allowed and interrupted by opening/closing operation of an intake valve 9. Communication between the combustion chamber 2 and the exhaust pipe 8 is allowed and interrupted by opening/closing operation of an exhaust valve 10. The intake valve 9 and the exhaust valve 10 are opened and closed in association with rotation of an intake cam shaft 11 and exhaust cam shaft 12 to which rotation of the crank shaft is transmitted.

An electronic control unit 15 is installed in the automobile. The electronic control unit 15 performs operation control of the engine 1, such as fuel injection control and throttle opening degree control. The electronic control unit 15 includes a CPU which performs various computations relating to control of the engine 1; a ROM which stores programs and data necessary for the control; a RAM which temporarily stores, for example, results of the computations performed by the CPU; input/output ports through which information is input from other elements, and is output to other elements. The electronic control unit 15 receives detection signals from various sensors described below.

That is, the electronic control unit 15 receives detection signals from an accelerator position sensor 17 for detecting the depression amount of the accelerator pedal 16; an air flow meter 18 for detecting the flow rate of air flowing into the intake pipe 3; a pressure sensor 22 for detecting the pressure in the intake pipe 3 on a downstream side of the throttle valve 19 (i.e., intake pipe pressure); a temperature sensor 23 for detecting a temperature of air in the intake pipe 3; a crank position sensor 25 for outputting a signal corresponding to the rotation of the crank shaft 7; and a cam position sensor 26 for outputting a signal corresponding to a rotational position of the intake cam shaft 11.

The electronic control unit 15 estimates an amount of air taken into the combustion chamber 2 of each of the cylinders #1 to #4 (hereinafter, referred to as "in-cylinder air amount"), and performs the operation control of the engine 1 such as the fuel injection amount control based on the in-cylinder air amount.

In order to appropriately perform the operation control of the engine 1, it is necessary to accurately estimate the in-cylinder air amount of each of the cylinders #1 to #4. The in-cylinder air amount is closely related not only to the amount of air flowing into the intake pipe 3 (inflow air amount), but also to pulsation of pressure in the intake pipe 3 caused by opening/closing of the intake valve 9 of each of the cylinders #1 to #4. Accordingly, in order to accurately estimate the in-cylinder air amount of each of the cylinders #1 to #4, it is important to estimate the in-cylinder air amount considering the pulsation of the pressure in the intake pipe 3.

Accordingly, in this embodiment of the invention, an excess air amount, which is an amount of air charged into the combustion chamber 2 (i.e., air charged into the cylinder) due to the pulsation of the pressure in the intake pipe 3, is calculated based on an amount of reduction in the pressure in the intake pipe due to opening of the intake valve 9. Then, on the basis of the excess air amount and the aforementioned inflow air amount, the in-cylinder air amount is estimated. Thus, it is possible to obtain the accurate in-cylinder air amount estimated considering the aforementioned pulsation.

Figure 2:
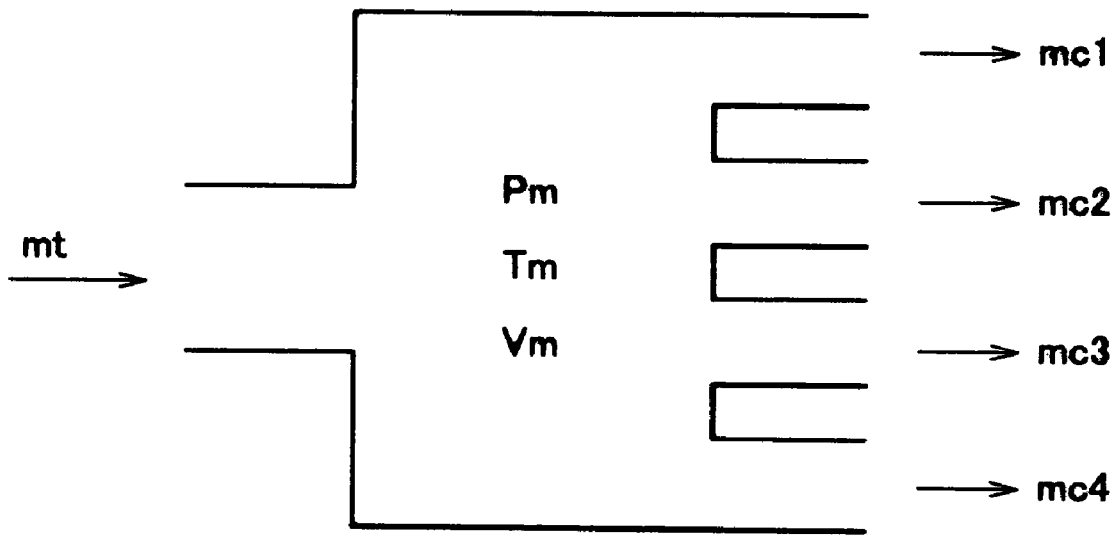
FIG. 2 is a diagram showing a fundamental concept of an intake pipe model.

Next, an outline of a procedure for estimating the aforementioned in-cylinder air amount will be described with reference to FIG. 2 and FIG. 3. FIG. 2 shows a fundamental concept of "intake pipe model M1" which is a model of the intake pipe portion in the engine 1. Also, in FIG. 3A, a solid line mt indicates a change with time in a flow rate (unit is

[g/sec]) of air flowing into the intake pipe 3, and a solid line mci indicates a change with time in a flow rate (unit is [g/sec]) of air flowing out to a cylinder #i from the intake pipe 3. In FIG. 3A, an area B corresponds to the aforementioned inflow air amount (unit is [g]), and an area A corresponds to the excess air amount (unit is [g]). Further, in FIG. 3B, a solid line indicates a change with time in the intake pipe pressure.

First, the intake pipe model M1 in FIG. 2 will be described. When a low of conservation of mass is applied to the intake pipe portion in the engine 1, a relation among an intake pipe pressure Pm, the flow rate of air flowing into the intake pipe 3 (hereinafter, referred to as "inflow flow rate mt"), and the flow rate of air flowing out to the cylinder #i from the intake pipe 3 (hereinafter, referred to as "outflow flow rate mci") is represented by an equation (1) described below.

$$\frac{dPm}{dt} = \frac{Ra \times Tm}{Vm} \times (mt - \sum mci) \quad (1)$$

In this equation, Tm is a temperature in the intake pipe, Vm is a volume of the intake pipe, and Ra is a value obtained by dividing a gas constant by an average number of molecules of air. By integrating this equation (1), it is possible to obtain an equation (2) which represents a change amount $\Delta Pm$ that is an amount of change in the intake pipe pressure Pm during $\Delta t$ seconds from a time t.

$$\Delta Pm = \frac{Ra \times Tm}{Vm} \times \int_{t}^{t+\Delta t} (mt - \sum mci) dt \quad (2)$$

This equation (2) shows that the intake pipe pressure Pm increases when the inflow flow rate mt is greater than the outflow flow rate $\Sigma mci$, the intake pipe pressure Pm decreases when the inflow flow rate mt is less than the outflow flow rate $\Sigma mci$, and the intake pipe pressure is constant when the inflow flow rate mt is equal to the outflow flow rate $\Sigma mci$. Further, the equation (2) shows that the change amount $\Delta Pm$ that is the amount of change in the intake pipe pressure Pm during $\Delta t$ seconds corresponds to an amount by which the air amount in the intake pipe 3 is changed. As shown in FIG. 3A, the outflow flow rate mci is changed greatly and intermittently depending on opening/closing of the intake valve 9. Meanwhile, the inflow flow rate mt is gradually changed since air in the intake pipe 3 serves as a buffer against the inflow air. Therefore, a relation of magnitude between the outflow flow rate $\Sigma mci$ and the inflow flow rate mt is repeatedly reversed. This signifies that the value in parentheses in the right side of the equation (2) is repeatedly changed from a positive value to a negative value, and from a negative value to a positive value in a constant cycle. That is, the intake pipe pressure Pm repeatedly increases and decreases in a constant cycle. Thus, the pulsation of the intake pipe pressure Pm occurs.

It is assumed that valve opening periods of the intake valves 9 in the cylinders #1 to #4 do not overlap with each other. In a case where air is taken into the cylinder #i, the intake pipe pressure Pm becomes a maximum value Pmmax when a time-differential value of the intake pipe pressure Pm becomes "0" (i.e., dPm/dt=0), that is, when the outflow flow rate mci becomes equal to the inflow flow rate mt (i.e., mci=mt) while the outflow flow rate mci in the cylinder #i is increasing. A time at which the intake pipe pressure Pm becomes the maximum value Pmmax is referred to as "maximum time Tmax". Meanwhile, in a case where the air is taken into the cylinder #i, the intake pipe pressure Pm becomes a minimum value Pmmin when a time-differential value of the intake pipe pressure Pm becomes "0", that is, when the outflow flow rate mci becomes equal to the inflow flow rate mt (i.e., mci=mt) while the outflow flow rate mci is decreasing. A time at which the intake pipe pressure Pm becomes the minimum value Pmmin is referred to as "minimum time Tmin".

A pressure reduction amount $\Delta Pmdwn$ that is an amount of reduction in the intake pipe pressure Pm due to intake of the air into the cylinder #i, that is, a difference between the maximum value Pmmax of the intake pipe pressure Pm and the minimum value Pmmin of the intake pipe pressure Pm is represented by an equation (3) described below.

$$\Delta Pmdwn = \left| \frac{Ra \times Tm}{Vm} \times \int_{t\max}^{t\min} (mt - \sum mci) dt \right| \quad (3)$$

Figure 3A:
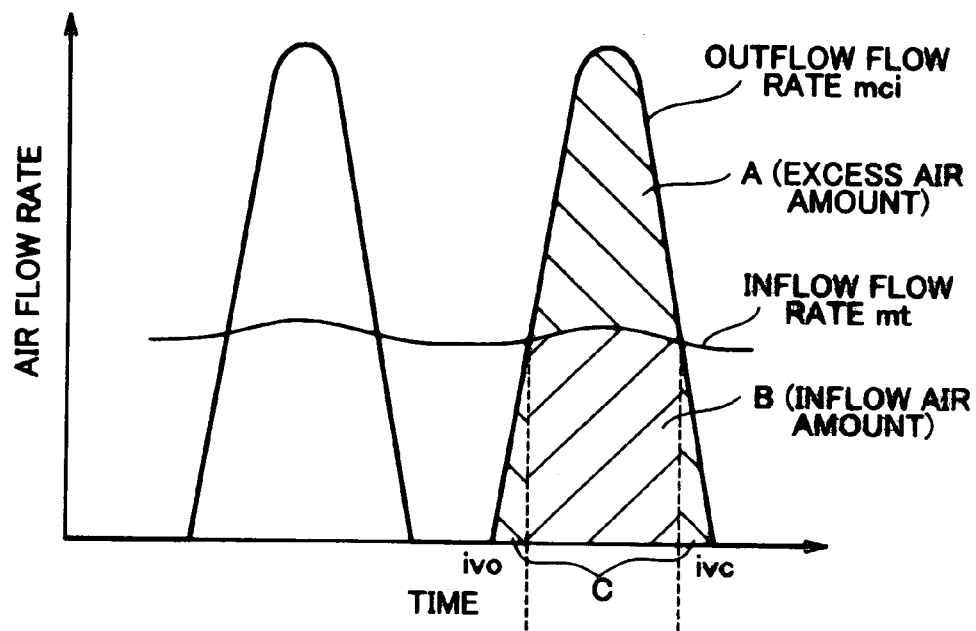
FIG. 3A and FIG. 3B are time charts showing changes with time in an inflow flow rate, an outflow flow rate, and intake pipe pressure.
Figure 3B:
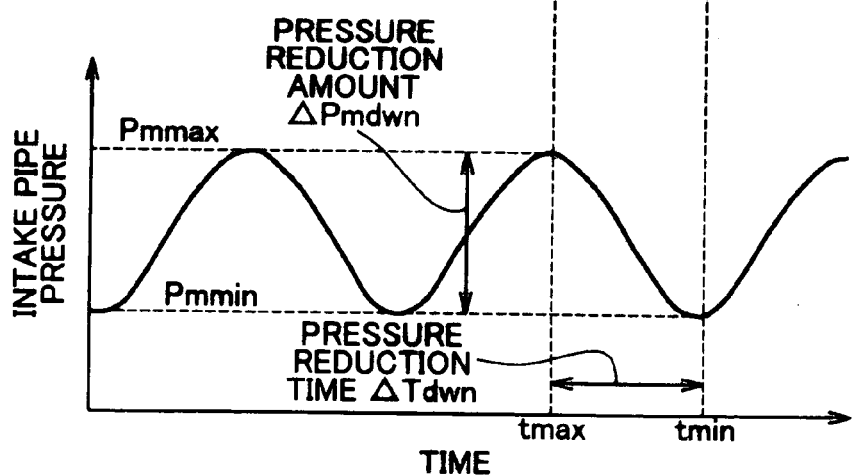

The integral term of the equation (3) corresponds to the area A in FIG. 3A. Accordingly, the pressure reduction amount $\Delta Pmdwn$ is proportional to the area A. The equation (3) can be changed to an equation (4) described below on the condition that the valve opening periods of the intake valves 9 in the cylinders #1 to #4 do not overlap with each other.

$$MC = \int_{t\max}^{t\min} mci \, dt \quad (4)$$
$$= \Delta Pmdwn / \left( \frac{Ra \times Tm}{Vm} \right) + \int_{t\max}^{t\min} mt \, dt$$

An integral term in the right side of the equation (4) corresponds to an area B in FIG. 3A. The integral term shows the amount of air flowing into the intake pipe 3 (inflow air amount) from the maximum time Tmax until the minimum time Tmin. Also, the term "$\Delta Pmdwn/(Ra \times Tm/Vm)$" in the right side of the equation (4) can be changed to "$k \times \Delta Pmdwn/Tm$" by replacing "Vm/Ra" with a constant k. This term corresponds to the area A in FIG. 3A. This term shows the amount of air that is charged into the cylinder due to the pulsation of the intake pipe pressure Pm (excess air amount) in addition to the aforementioned inflow air amount that is the amount of air taken into the cylinder. The excess air amount is calculated based on the pressure reduction amount $\Delta Pmdwn$ of the intake pipe pressure Pm, and the like. Accordingly, an in-cylinder air amount MC calculated according to the equation (4) is a value obtained by adding the aforementioned excess air amount to the inflow air amount that is the amount of air flowing into the intake pipe 3 from the maximum time Tmax until the minimum time Tmin.

However, strictly speaking, the actual in-cylinder air amount corresponds to a value obtained by adding an area C to the area A and the area B in FIG. 3A. The in-cylinder air amount MC calculated according to the equation (4) is an approximate value obtained without considering an air amount corresponding to the area C. The air amount corresponding to the area C is negligible when the valve opening periods of the intake valves 9 in the cylinders #1 to #4 do not overlap with each other. However, the air amount corresponding to the area C becomes so large that the air amount cannot be neglected when the valve opening periods overlap with each other. Therefore, in order to accurately calculate the in-cylinder air amount MC also when the valve opening periods of the intake valves 9 in the cylinders #1 to #4 overlap with each other, the equation (4) is changed to an equation (5) described below, by replacing the integral term in the right side of the equation (4) with a term for obtaining the area B and the area C.

$$MC = \frac{k \times \Delta Pmdwn}{Tm} + \frac{mt \times (\Delta tdwn + ivc - ivo)}{2} \quad (5)$$

The term "mt (Δtdwn+ivc−ivo)/2" in the right side of the equation (5) is for calculating an area of a substantially trapezoid corresponding to the area B and the area C in FIG. 3A, by summing the area B and the area C. In this equation (5), Δtdwn is a time period from the maximum time Tmax until the minimum time Tmin. A valve opening time ivo is a time at which the intake valve 9 is opened in the cylinder #i. A valve closing time ivc is a time at which the intake valve 9 is closed in the cylinder #i. The in-cylinder air amount MC calculated according to the equation (5) is more accurate than the in-cylinder air amount MC calculated according to the equation (4).

Next, detailed description will be made of the pressure reduction amount ΔPmdwn used for calculating the in-cylinder air amount MC (including the excess air amount) according to the equation (5), with reference to a time chart in FIG. 4.

Figure 4A:
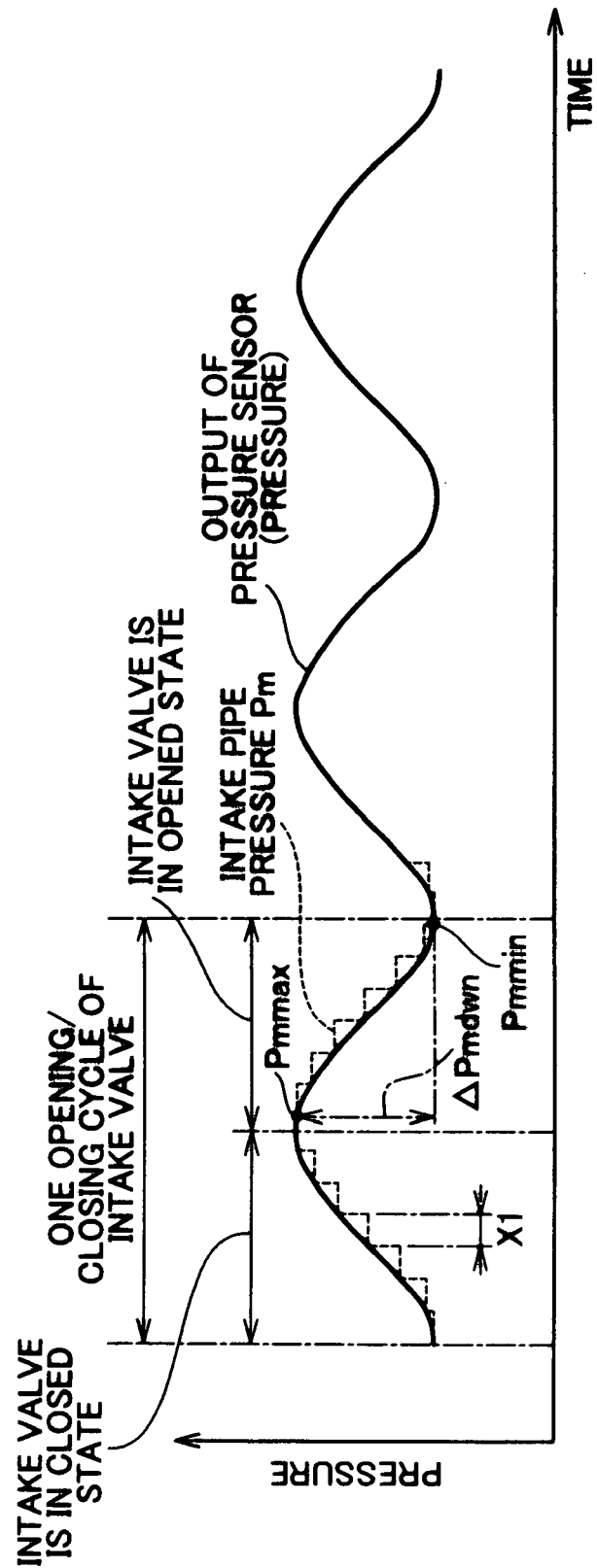
FIG. 4A and FIG. 4B are time charts showing a change in an output of a pressure sensor (pressure), and a change in an intake pipe pressure Pm obtained by performing quantization of the output using analogue to digital conversion in a sampling cycle X1.

In FIG. 4A, a solid line shows a waveform of an output of the pressure sensor 22, that is, a change in actual pressure in the intake pipe 3. The actual pressure in the intake pipe 3 increases while the intake valve 9 in each of the cylinders #1 to #4 is in a closed state, and decreases while the intake valve 9 is in an opened state. The electronic control unit 15 performs quantization of the output of the pressure sensor 22 using analogue to digital conversion in a predetermined sampling cycle X1, and a value obtained by the quantization is used as the intake pipe pressure Pm. The intake pipe pressure Pm changes according to the actual pressure in the intake pipe 3. Therefore, the intake pipe pressure Pm decreases while the intake valve 9 is in the opened state. Then, the maximum value of the intake pipe pressure Pm while the intake valve 9 is in the opened state is used as the aforementioned maximum value Pmmax. The minimum value of the intake pipe pressure Pm while the intake valve 9 is in the opened state is used as the minimum value Pmmin. Further, a difference between the maximum value Pmmax and the minimum value Pmmin is used as the pressure reduction amount ΔPmdwn that is the amount of reduction in the intake pipe pressure Pm due to opening of the intake valve 9.

However, since the accuracy of the intake pipe pressure Pm is decreased due to an error in quantization or noise, the accuracy of the pressure reduction amount ΔPmdwn for calculating the excess air amount is decreased accordingly. Therefore, the pressure reduction amounts ΔPmdwn are obtained while the opening/closing cycle of the intake valve 9 in the same cylinder is repeated plural times, and the obtained pressure reduction amounts ΔPmdwn are averaged. Then, the averaged value is used as the pressure reduction amount ΔPmdwn for calculating the excess air amount, whereby a decrease in the accuracy is prevented. In this case, one opening/closing cycle of the intake valve 9 is a time period from when the state of the intake valve 9 is changed from an opened state to a closed state until when the state of the intake valve 9 is changed from the opened state to a closed state next time. In other words, one opening/closing cycle of the intake valve 9 is a time period from when the actual pressure (shown by the solid line) in the intake pipe 3 becomes the minimum value until when the actual pressure in the intake pipe 3 becomes the minimum value next time.

Meanwhile, a pulsation cycle of the actual pressure in the intake pipe 3 changes due to a change in the opening/closing mode of the intake valve 9 and the like. For example, in a case where the opening/closing cycle of the intake valve 9 becomes long when the engine rotational speed is low, the aforementioned pulsation cycle of the pressure becomes long. Also, in a case where the number of operating cylinders can be changed according to an operating state of the engine 1, and driving of the intake valve 9 is stopped in a cylinder whose operation is being stopped when the number of the operating cylinders is decreased, the pulsation cycle of the pressure becomes longer due to stoppage of driving of the intake valve 9. When the pulsation cycle is sufficiently longer than the sampling cycle X1 for analogue to digital conversion, the number of times of performing sampling in one opening/closing cycle of the intake valve 9 is increased. Therefore, the maximum value Pmmax and the minimum value Pmmin of the intake pipe pressure Pm are not greatly different from the actual maximum value and the actual minimum value.

Figure 4B:
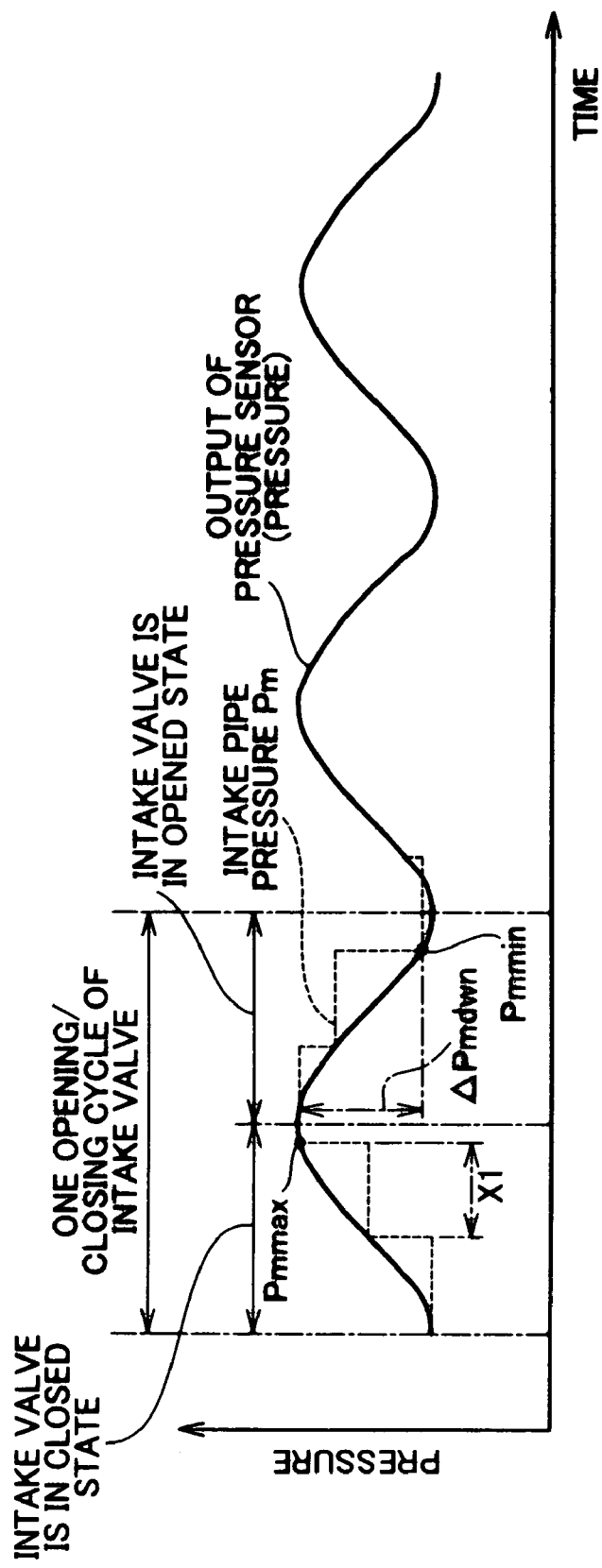

However, in a case where the pulsation cycle becomes shorter and becomes closer to the sampling cycle X1, for example, when then engine rotational speed is high, or when all the cylinders are operated, the number of times of performing sampling in one opening/closing cycle of the intake valve 9 is decreased, as shown in FIG. 4B. Therefore, the maximum value Pmmax and the minimum value Pmmin of the intake pipe pressure Pm become greatly different from the actual maximum value and the actual minimum value. As a result, it becomes difficult to ensure necessary accuracy of the pressure reduction amount ΔPmdwn that is the difference between the maximum value Pmmax and the minimum value Pmmin.

Accordingly, when it is determined that a ratio of a length of the pulsation cycle to a length of the sampling cycle X1 is less than a predetermined level, that is, when it is determined that the length of the pulsation cycle is so close to the length of the sampling cycle X1 that it is difficult to ensure necessary accuracy of the pressure reduction amount ΔPmdwn, a measure is taken to ensure necessary accuracy of the pressure reduction amount ΔPmdwn for calculating the excess air amount, which is the average value of the pressure reduction amount ΔPmdwn. As the measure, the pressure reduction amount ΔPmdwn for calculating the excess air amount is obtained using an averaging method with high accuracy as compared to an ordinary method. Thus, it is possible to obtain necessary accuracy of the pressure reduction amount ΔPmdwn.

Figure 5:
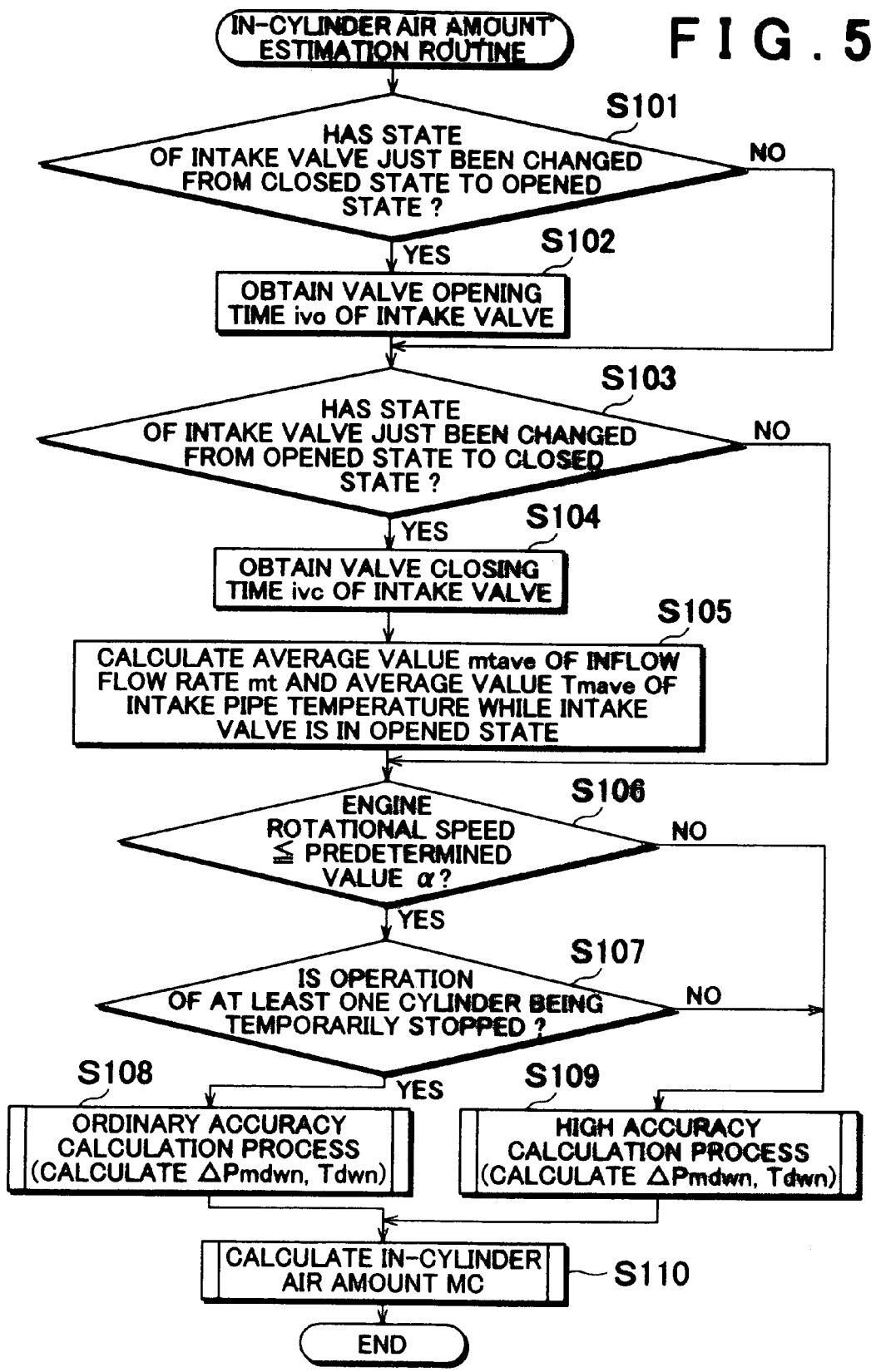
FIG. 5 is a flowchart showing a procedure for calculating an in-cylinder air amount in the first embodiment.

Next, description will be made of a specific procedure for estimating the in-cylinder air amount MC, with reference to a flowchart in FIG. 5 showing an in-cylinder air amount estimation routine. The in-cylinder air amount estimation routine is performed for each cylinder through the electronic control unit 15 as a time interrupt, for example, at predetermined time intervals. The aforementioned time intervals at which the in-cylinder air amount estimation routine is performed is sufficiently shorter than the valve opening period of the intake valve 9 in a corresponding cylinder.

In the in-cylinder air amount estimation routine, first, it is determined whether the state of the intake valve 9 has just been changed from the closed state to the opened state (S103). When an affirmative determination is made, the valve opening time ivo of the intake valve 9 is obtained (S102). Next, it is determined whether the state of the intake valve 9 has just been changed from the opened state to the closed state (S103). When an affirmative determination is made, the valve closing time ivc of the intake valve 9 is obtained (S104). Further, calculations are made to obtain an average value mtave of the inflow flow rate mt, and an average value Tmave of an intake pipe temperature Tm that is a temperature in the intake pipe while the intake valve 9 is in the opened state (S105).

Subsequently, in operations in steps S106 to S109, the pressure reduction amount ΔPmdwn for calculating the excess air amount is obtained, according to the ratio of the length of the pulsation cycle of the pressure in the intake pipe 3 to the length of the sampling cycle X1, using an averaging method with ordinary accuracy or an averaging method with higher accuracy.

In series of these operations, in steps S106 and S107, it is determined whether the ratio of the length of the pulsation cycle to the length of the sampling cycle X1 is less than the predetermined level. This determination is made based on whether the engine rotational speed that is obtained based on the detection signal from the crank position sensor 25 is lower than a predetermined value α (S106), and whether operation of at least one cylinder is being temporarily stopped (S107).

That is, when the engine rotational speed is lower than the predetermined value α, and the operation of at least one cylinder is being temporarily stopped (i.e., affirmative determinations are made both in step S106 and S107), it is determined that the length of the pulsation cycle is sufficiently longer than the length of the sampling cycle X1, and the ratio of the length of the pulsation cycle to the length of the sampling cycle X1 is equal to or greater than the predetermined level. Then, the routine proceeds to step S108. In the case where the ratio of the length of the pulsation cycle to the length of the sampling cycle X1 becomes less than the predetermined value, it becomes difficult to ensure necessary accuracy of the pressure reduction amount ΔPmdwn for calculating the excess air amount. Also, the aforementioned value a is set to a value which makes it possible to accurately determine whether the ratio of the length of the pulsation cycle to the length of the sampling cycle X1 is equal to or greater than the predetermined level.

In step S108, the pressure reduction amount ΔPmdwn for calculating the excess air amount is obtained using the averaging method with ordinary accuracy, and an ordinary accuracy calculation process is performed for calculating a pressure reduction time ΔTdwn that is a time required for reducing the intake pipe pressure Pm by the pressure reduction amount ΔPmdwn. Then, the in-cylinder air amount MC is calculated according to the equation (5) (S110). In this case, the valve opening time ivo, the valve closing time ivc, the pressure reduction amount ΔPmdwn, and the pressure reduction time ΔTdwn are substituted into the equation (5). In addition, the average value mtave and the average value Tmave calculated in step S105 are substituted into the equation (5) as the inflow flow rate mt and the intake pipe temperature Tm, respectively. Thus, the in-cylinder air amount MC is calculated.

Meanwhile, when it is determined that the engine rotational speed is equal to or higher than the predetermined value α, or all the cylinders are operated in steps S106 and S107 (i.e., negative determinations are made both in steps S106 and S107), it is determined that the length of the pulsation cycle is close to the length of the sampling cycle X1, and the ratio of the length of the pulsation cycle to the length of the sampling cycle X1 is less than the predetermined level. Then, the routine proceeds to step S109.

In step S109, the pressure reduction amount ΔPmdwn for calculating the excess air amount is obtained using an averaging method with higher accuracy than that of the aforementioned averaging method with ordinary accuracy. Also, a high accuracy calculation process is performed for calculating the pressure reduction time ΔTdwn that is the time required for reducing the intake pipe pressure Pm by the pressure reduction amount ΔPmdwn. Then, the process in the aforementioned step S110 is performed.

Figure 6:
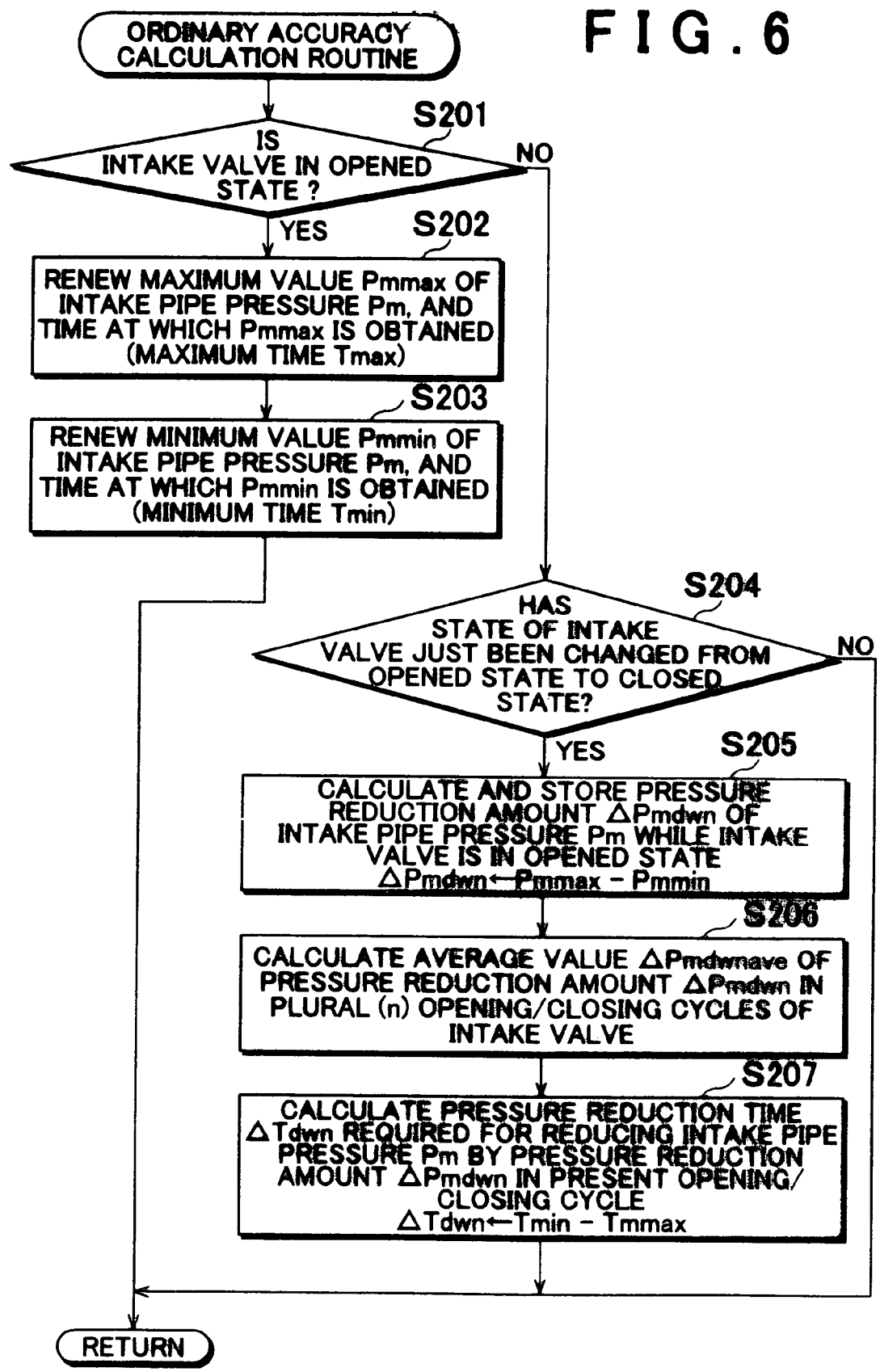
FIG. 6 is a flowchart showing a procedure for calculating a pressure reduction amount $\Delta Pmdwn$ for calculating an excess air amount (an average value $\Delta Pmdwnave$) with ordinary accuracy, and a procedure for calculating a pressure reduction time $\Delta Tdwn$ required for reducing the intake pipe pressure Pm by the pressure reduction amount $\Delta Pmdwn$ in the first embodiment.

Next, detailed description will be made of the ordinary accuracy calculation process in step S108 in the in-cylinder air amount estimation routine, with reference to a flowchart in FIG. 6 showing the ordinary accuracy calculation routine. This routine is performed through the electronic control unit 15 every time the in-cylinder air amount estimation routine (FIG. 5) proceeds to step S108.

In the ordinary accuracy calculation routine, first, it is determined whether the intake valve 9 is in the opened state (S201). When an affirmative determination is made in step S201, the maximum value Pmmax of the intake pipe pressure Pm and the maximum time Tmax at which the maximum value Pmmax is obtained are renewed (S202). In addition, the minimum value Pmmin of the intake pipe pressure Pm and the minimum time Tmin at which the minimum value Pmmin is obtained are renewed (S203). That is, when the value of the intake pipe pressure Pm becomes the maximum value during a time period from when the intake valve 9 is opened until a present time, the maximum value is stored as a new maximum value Pmmax, and the time at which the value of the intake pipe pressure Pm becomes the maximum value is stored as a new maximum time Tmax. Meanwhile, when the intake pipe pressure Pm becomes the minimum value during a time period from when the intake valve 9 is opened until the present time, the minimum value is stored as a new minimum value Pmmin, and the time at which the value of the intake pipe pressure Pm becomes the minimum value is stored as a new minimum time Tmin.

Meanwhile, when the state of the intake valve 9 has just been changed from the opened state to the closed state (i.e., an affirmative determination is made in step S204), the pressure reduction amount ΔPmdwn of the intake pipe pressure Pm while the intake valve 9 is in the opened state is calculated by obtaining the difference between the maximum value Pmmax and the minimum value Pmmin that are stored. Then, the pressure reduction amount ΔPmdwn is stored in the RAM (S205). Subsequently, in step S206, an average value ΔPmdwnave of the pressure reduction amount ΔPmdwn in plural opening/closing cycles of the intake valve 9, for example, "n" opening/closing cycles ("n" is a number equal to or greater than 2) is calculated. The average value ΔPmdwnave is used as the pressure reduction amount ΔPmdwn for calculating the excess air amount. More specifically, the pressure reduction amounts ΔPmdwn are obtained and stored while the opening/closing cycle of the intake valve 9 is repeated plural times, that is, the pressure reduction amounts ΔPmdwn are obtained and stored from when the opening/closing cycle is performed n times before until when the present opening/closing cycle is performed, and the stored pressure reduction amounts ΔPmdwn are read from the RAM. The sum of the pressure reduction amounts ΔPmdwn is divided by the number "n", whereby the average value ΔPmdwnave is obtained. Further, in step S207, the pressure reduction time ΔTdwn, which is the time required for reducing the intake pipe pressure Pm by the pressure reduction amount ΔPmdwn in the present opening/closing cycle, is calculated by obtaining the difference between the minimum time Tmin and the maximum time Tmax that are stored in steps S202 and S203.

As described above, in the case where the pressure reduction amount ΔPmdwn for calculating the excess air amount (the average value ΔPmdwnave) is obtained using the averaging method with ordinary accuracy, when the length of the pulsation cycle of the pressure in the intake pipe 3 becomes close to the length of the sampling cycle for the analogue to digital conversion, the accuracy of the pressure reduction amount ΔPmdwn obtained in one opening/closing cycle is decreased. As a result, it becomes difficult to ensure necessary accuracy of the average value ΔPmdwnave. Therefore, in the case where the ratio of the length of the pulsation cycle to the length of the sampling cycle X1 is less than the predetermined level, the average value ΔPmdwnave is obtained using the averaging method with high accuracy through the high accuracy calculation process in step S109 (FIG. 5) in the in-cylinder air amount estimation routine.

Figure 7:
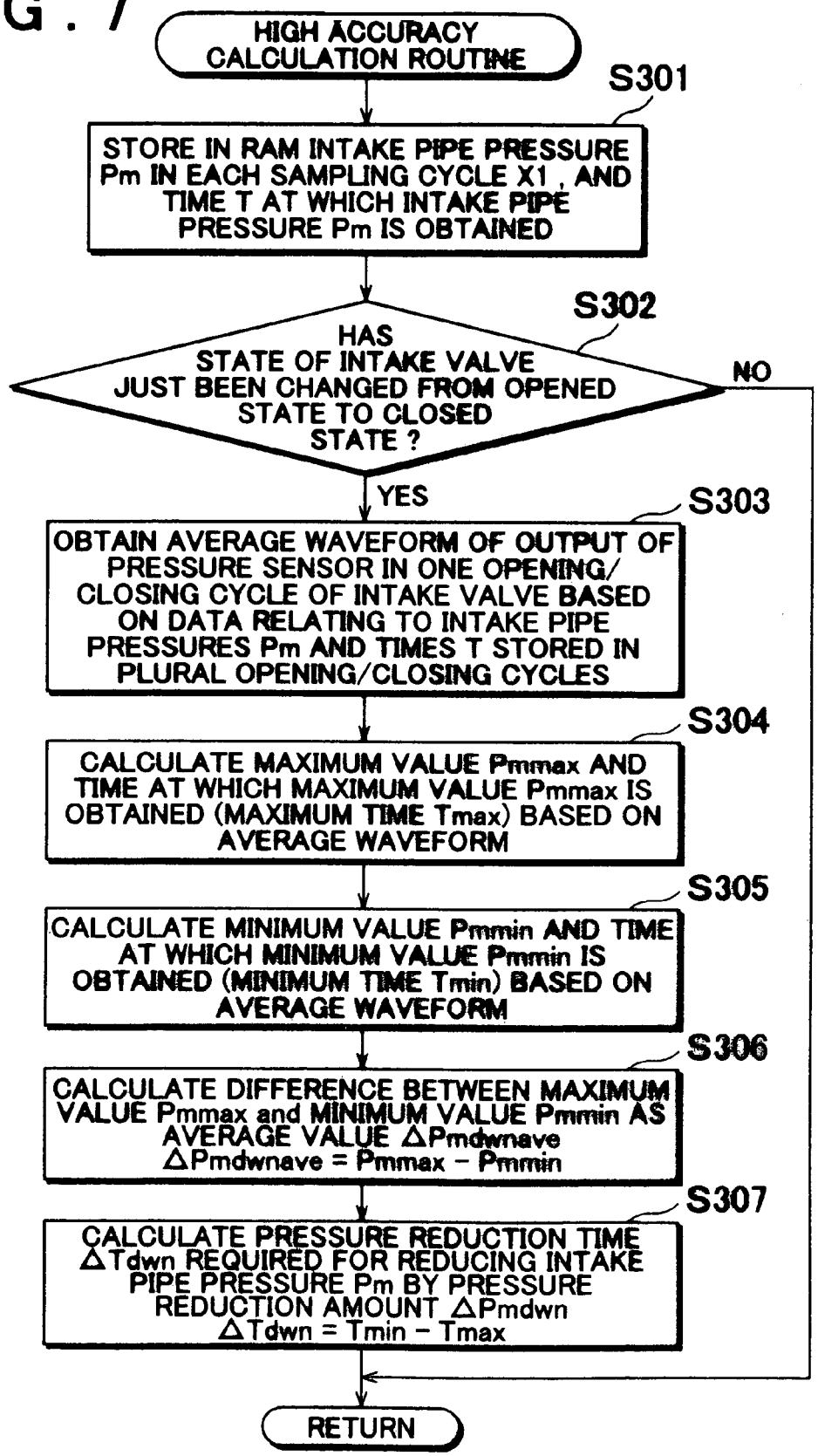
FIG. 7 is a flowchart showing a procedure for calculating the pressure reduction amount $\Delta Pmdwn$ for calculating the excess air amount (the average value $\Delta Pmdwnave$) with high accuracy, and a procedure for calculating the pressure reduction time $\Delta Tdwn$ required for reducing the intake pipe pressure Pm by the pressure reduction amount $\Delta Pmdwn$ in the first embodiment.

Next, detailed description will be made of the high accuracy calculation process in step 109, with reference to a flowchart in FIG. 7 showing the high accuracy calculation routine. The routine is performed through the electronic control unit 15 every time the in-cylinder air amount estimation routine proceeds to step S109.

Figure 8:
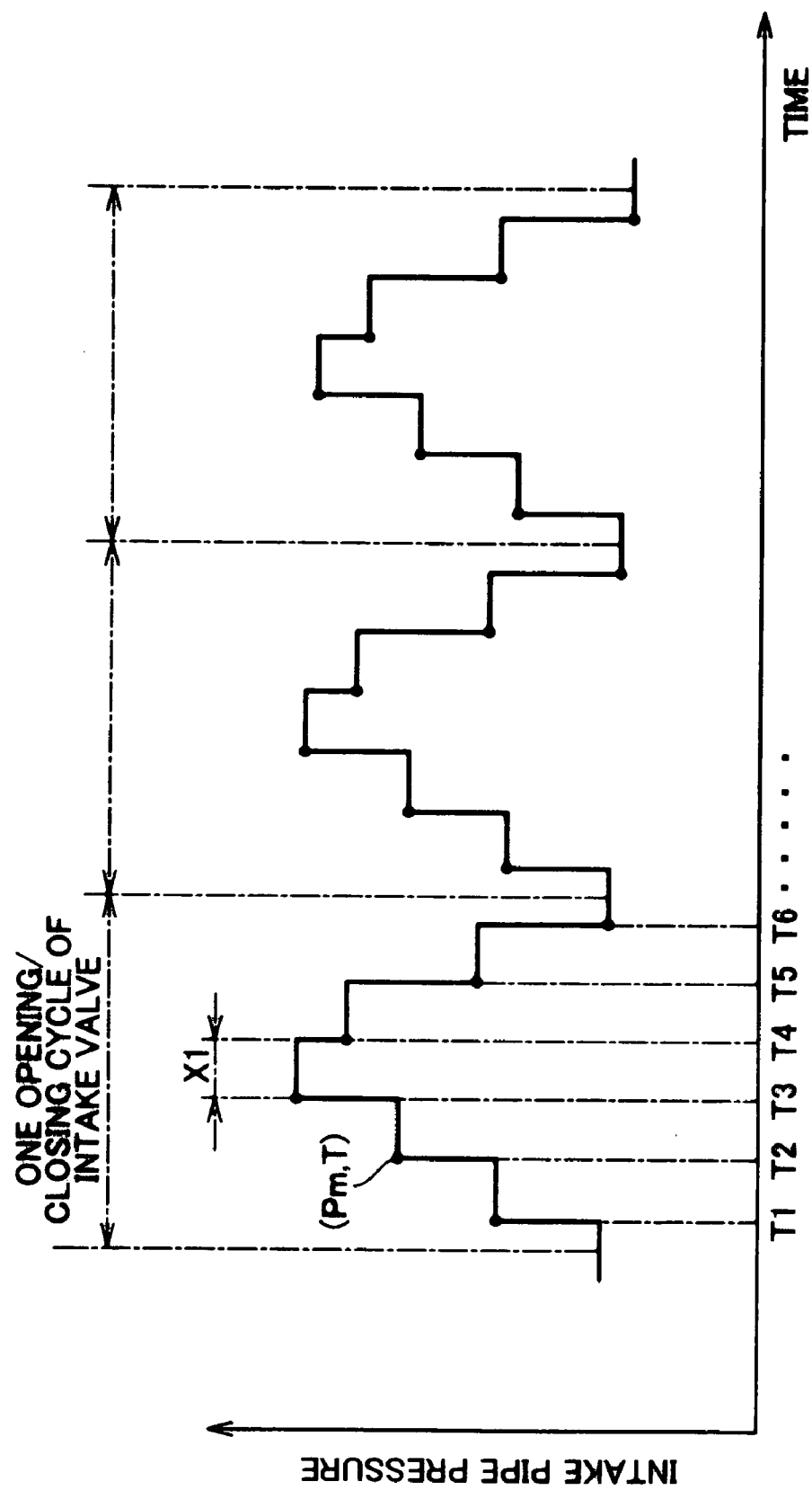
FIG. 8 is a time chart schematically showing a change in the intake pipe pressure Pm while an opening/closing cycle of an intake valve is repeated plural times.

In the high accuracy calculation routine, first, the intake pipe pressure Pm in each sampling cycle X1 is stored in the RAM, and a time T at which the intake pipe pressure Pm is obtained is also stored in the RAM during each opening/closing cycle of the intake valve 9 (S301). If the intake pipe pressure Pm changes while the opening/closing cycle is repeated plural times as shown in FIG. 8, the RAM stores, through the process in step S301, the intake pipe pressure Pm in each sampling cycle X1, that is, the intake pipe pressure Pm at the time T such as Ti, T2, and T3, and the time T.

Figure 9:
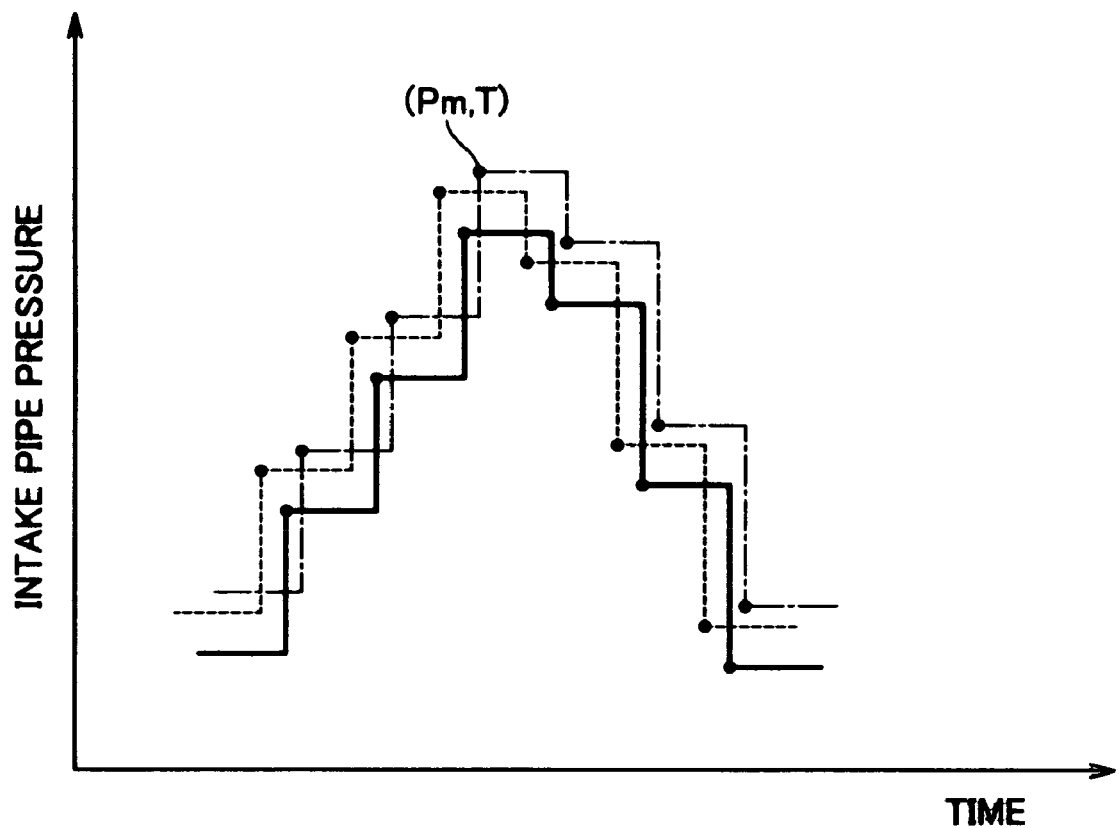
FIG. 9 is a time chart in which each of superimposed plural (three) lines schematically indicates a change in the intake pipe pressure Pm in one opening/closing cycle.
Figure 10:
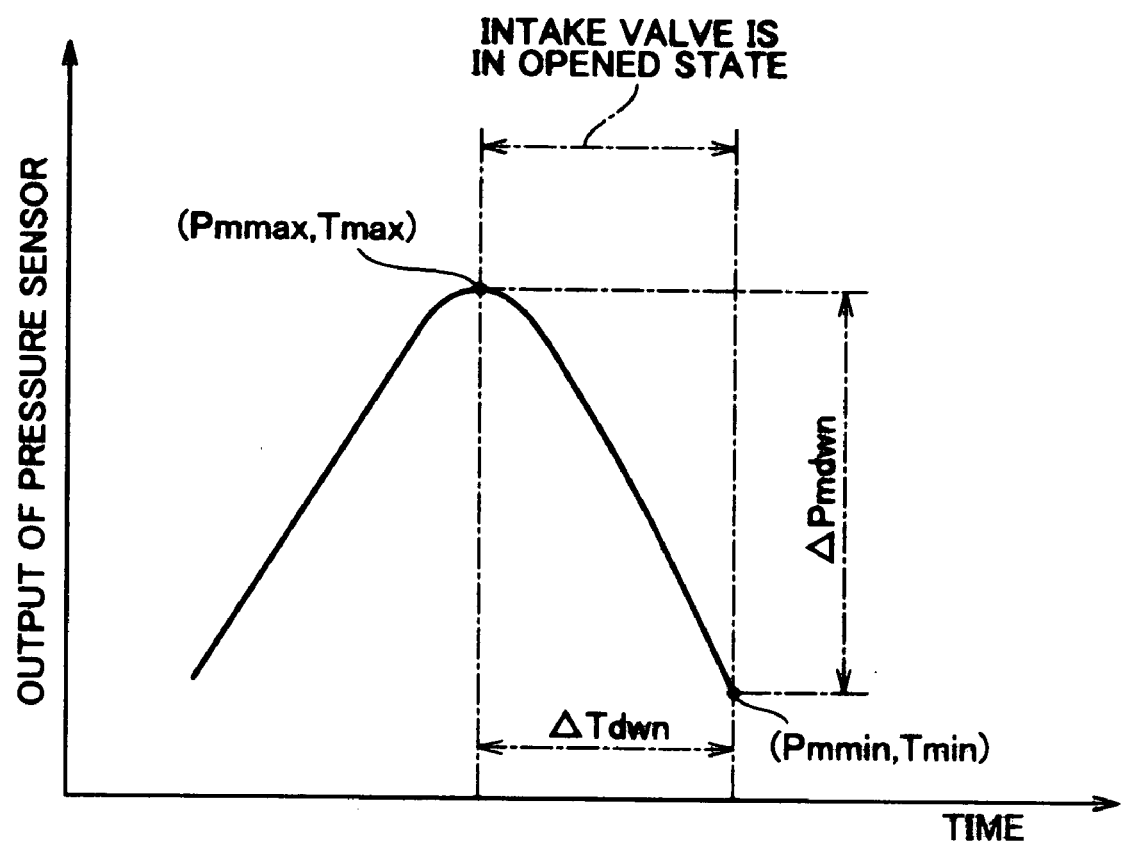
FIG. 10 is a waveform diagram showing an average waveform of the output of the pressure sensor 22 (pressure) in one opening/closing cycle based on date relating to the intake pipe pressure Pm and a time T obtained while the opening/closing cycle is repeated plural times.

Subsequently, when the state of the intake valve 9 has just been changed from the opened state to the closed state (i.e., an affirmative determination is made in step S302), an average waveform of the output of the pressure sensor 22 (i.e., an average waveform of the pressure) in one opening/closing cycle of the intake valve 9 is obtained based on data relating to the intake pipe pressures Pm and the times T which are stored while the opening/closing cycle is repeated plural times (e.g., "n" times) (S303). FIG. 9 is a time chart in which each of superimposed plural lines indicates a change in the intake pipe pressure Pm obtained based on data relating to the intake pipe pressures Pm and the times T in one opening/closing cycle. In FIG. 9, for example, a solid line shows the change in the intake pipe pressure Pm in a first opening/closing cycle, a dashed line shows the change in the intake pipe pressure Pm in a second opening/closing cycle, and a chain line shows the change in the intake pipe pressure Pm in a third opening/closing cycle. An average waveform of the output of the pressure sensor 22 (i.e., an average waveform of the pressure) in one opening/closing cycle of the intake valve 9 is obtained based on data relating to the intake pipe pressures Pm and the times T obtained in the plural opening/closing cycles. FIG. 10 shows an example of the average waveform.

Then, in step S304, the maximum value Pmmax of the intake pipe pressure Pm during the valve opening period of the intake valve 9, and the time Tmax at which the maximum value Pmmax is obtained are calculated based on the average waveform. Further, in step S305, the minimum value Pmmin of the intake pipe pressure Pm during the valve opening period of the intake valve 9 and the minimum time Tmin at which the minimum value Pmmin is obtained are calculated based on the average waveform. Then, the difference between the maximum value Pmmax and the minimum value Pmmin is calculated as the average value ΔPmdwnave of the pressure reduction amount ΔPmdwn in the plural opening/closing cycles (S306). The accuracy of the average value ΔPmdwnave, which is used as the pressure reduction amount ΔPmdwn for calculating the excess air amount, is high. When the in-cylinder air amount MC is calculated according to the equation (5), the average value ΔPmdwnave is used. Also, the difference between the minimum time Tmin and the maximum time Tmax is calculated as the pressure reduction time ΔTdwn which is the time required for reducing the intake pipe pressure Pm by the pressure reduction amount ΔPmdwn (the average value ΔPmdwnave) (S307).

In the embodiment that has been described in detail, the following effects can be obtained.

(1) When estimating the in-cylinder air amount MC in each of the cylinders #1 to #4, the amount of air charged into the cylinder due to the pulsation of the intake pipe pressure Pm (i.e., excess air amount) is considered. Therefore, it is possible to obtain the accurate in-cylinder air amount MC estimated considering the pulsation.

(2) The excess air amount is obtained based on the pressure reduction amount ΔPmdwn that is the amount of reduction in the intake pipe pressure Pm due to opening of the intake valve 9. The intake pipe pressure Pm is the value obtained by performing quantization of the output of the pressure sensor 22 using the analogue to digital conversion in the predetermined sampling cycle X1. The accuracy of the intake pipe pressure Pm is inevitably decreased due to an error in the quantization or noise. However, as the pressure reduction amount ΔPmdwn used for calculating the excess air amount, the value obtained by averaging the pressure reduction amounts ΔPmdwn obtained while the opening/closing cycle of the intake valve 9 is repeated plural times (i.e., the average value ΔPmdwnave) is employed. Since the average value ΔPmdwnave is used as the pressure reduction amount ΔPmdwn for calculating the excess air amount, it is possible to suppress a decrease in the accuracy of the pressure reduction amount ΔPmdwn due to an error in the quantization or noise.

(3) When it is determined that the ratio of the length of the pulsation cycle of the pressure in the intake pipe 3 to the length of the sampling cycle X1 is less than the predetermined level, the pressure reduction amount ΔPmdwn for calculating the excess air amount (i.e., the average value ΔPmdwnave) is obtained using the averaging method with high accuracy. In the averaging method with high accuracy, the average waveform of the output of the pressure sensor (i.e., the average waveform of the pressure) in one opening/closing cycle of the intake valve 9 is obtained based on data relating to the intake pipe pressures Pm and the times T obtained in the plural opening/closing cycles of the intake valve 9. The difference between the maximum value Pmmax and the minimum value Pmmin in the average waveform is used as the average value ΔPmdwnave. Thus, since the average value ΔPmdwnave is obtained based on the average waveform, it is possible to ensure high accuracy of the average value ΔPmdwnave which is used as the pressure reduction amount ΔPmdwn for calculating the excess air amount.

However, when obtaining the average waveform, it is necessary to perform complicated calculation using a large amount of data relating to the intake pipe pressures Pm and the times T obtained in the plural opening/closing cycles. Therefore, a calculation load of the CPU inevitably increases in the electronic control unit 15, and a large amount of memory is inevitably used in the RAM in order to store the large amount of data.

Accordingly, when it is determined that the ratio of the length of the pulsation cycle of the pressure in the intake pipe 3 to the length of the sampling cycle X1 is equal to or greater than the predetermined level, the pressure reduction amount ΔPmdwn for calculating the excess air amount (i.e., the average value ΔPmdwnave) is obtained using the averaging method with ordinary accuracy. In the averaging method with ordinary accuracy, each time the opening/closing cycle of the intake valve 9 is performed, the difference between the maximum value Pmmax and the minimum value Pmmin of the intake pipe pressure Pm while the intake air valve 9 is in the opened state is obtained as the pressure reduction amount ΔPmdwn of the intake pipe pressure Pm. Then, the average value ΔPmdwnave of the pressure reduction amount ΔPmdwn is obtained by averaging the pressure reduction amounts ΔPmdwn in plural opening/closing cycles of the intake valve 9. The average value ΔPmdwnave is used as the pressure reduction amount ΔPmdwn for calculating the excess air amount. In this case, when calculating the pressure reduction amount ΔPmdwn for calculating the excess air amount (the-average value ΔPmdwnave), the average waveform is not obtained unlike the aforementioned averaging method with high accuracy. This averaging method with ordinary accuracy includes only the process of calculating the pressure reduction amount ΔPmdwn in each opening/closing cycle, the process of storing the result of the calculation, and the process of averaging the stored pressure reduction amounts ΔPmdwn obtained while the opening/closing cycle is repeated plural times. Therefore, it is possible to suppress an increase in the calculation load of the CPU, and an increase in the amount of used memory in the RAM in the electronic control unit 15.

As described above, the averaging method with high accuracy or the averaging method with ordinary accuracy is selected based on whether the ratio of the length of the pulsation cycle of the pressure to the length of the sampling cycle X1 is less than the predetermined level. Therefore, it is possible to ensure necessary accuracy of the pressure reduction amount ΔPmdwn for calculating the excess air amount (the average value ΔPmdwnave), and to minimize an increase in the calculation load, and an increase in the amount of used memory.

Next, a second embodiment of the invention will be described with reference to FIG. 11 and FIG. 12. In this embodiment, the number of times of repeating the opening/closing cycle for obtaining the pressure reduction amount ΔPmdwn for calculating the excess air amount (the average value ΔPmdwnave) is changed based on the ratio of the length of the pulsation cycle of the pressure in the intake pipe 3 to the length of the sampling cycle X1. When it is determined that the length of the pulsation cycle and the length of the sampling cycle X1 is less than the predetermined level, the number of times of repeating the opening/closing cycle for obtaining the pressure reduction amount ΔPmdwn for calculating the excess air amount (the average value ΔPmdwnave) is increased so that necessary accuracy of the average value ΔPmdwnave can be ensured.

Figure 11:
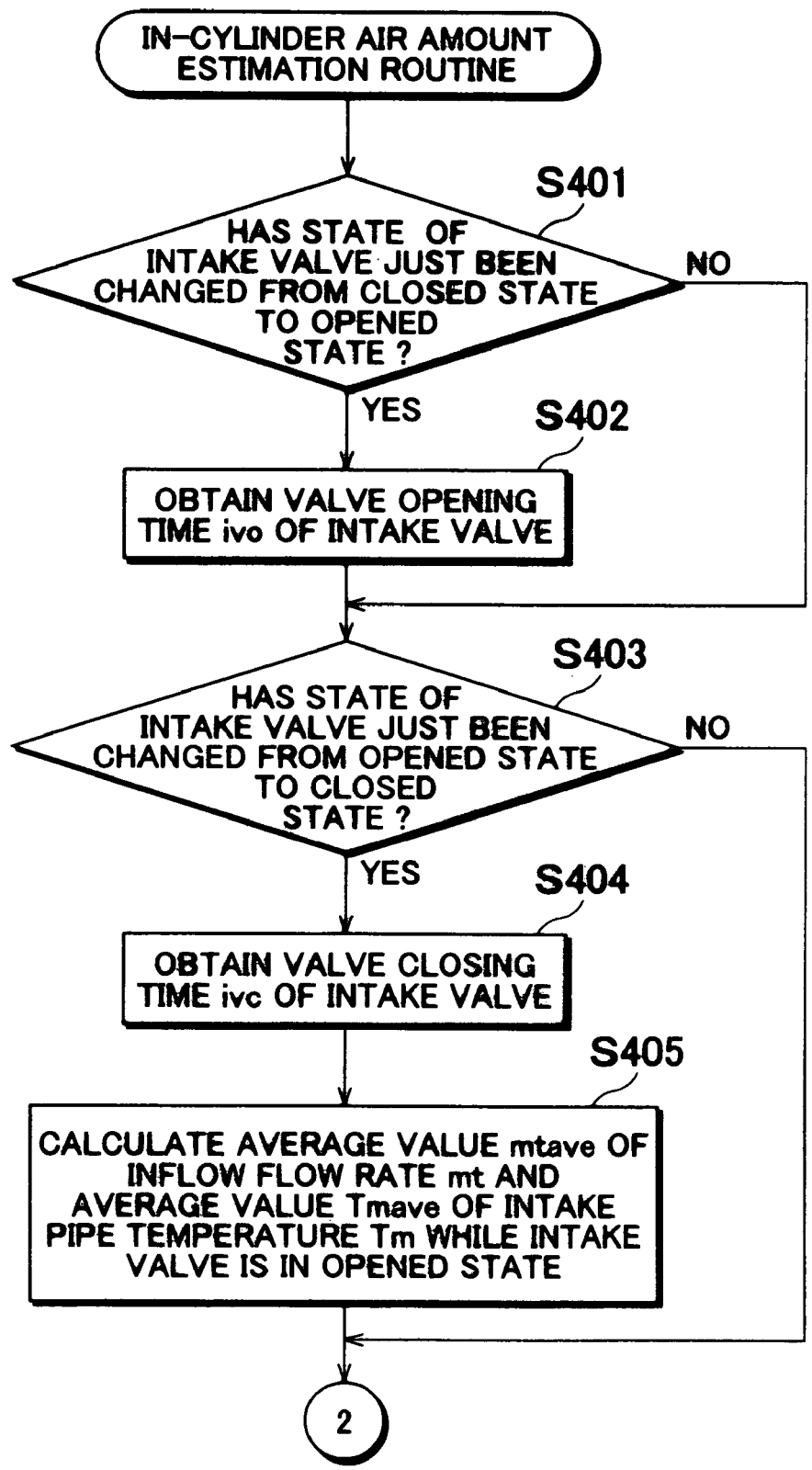
FIG. 11 is a first half of a flowchart showing a procedure for calculating the pressure reduction amount $\Delta Pmdwn$ for calculating the excess air amount (the average value $\Delta Pmdwnave$), and a procedure for calculating the pressure reduction time $\Delta Tdwn$ required for reducing the intake pipe pressure Pm by the pressure reduction amount $\Delta Pmdwn$ in a second embodiment.
Figure 12:
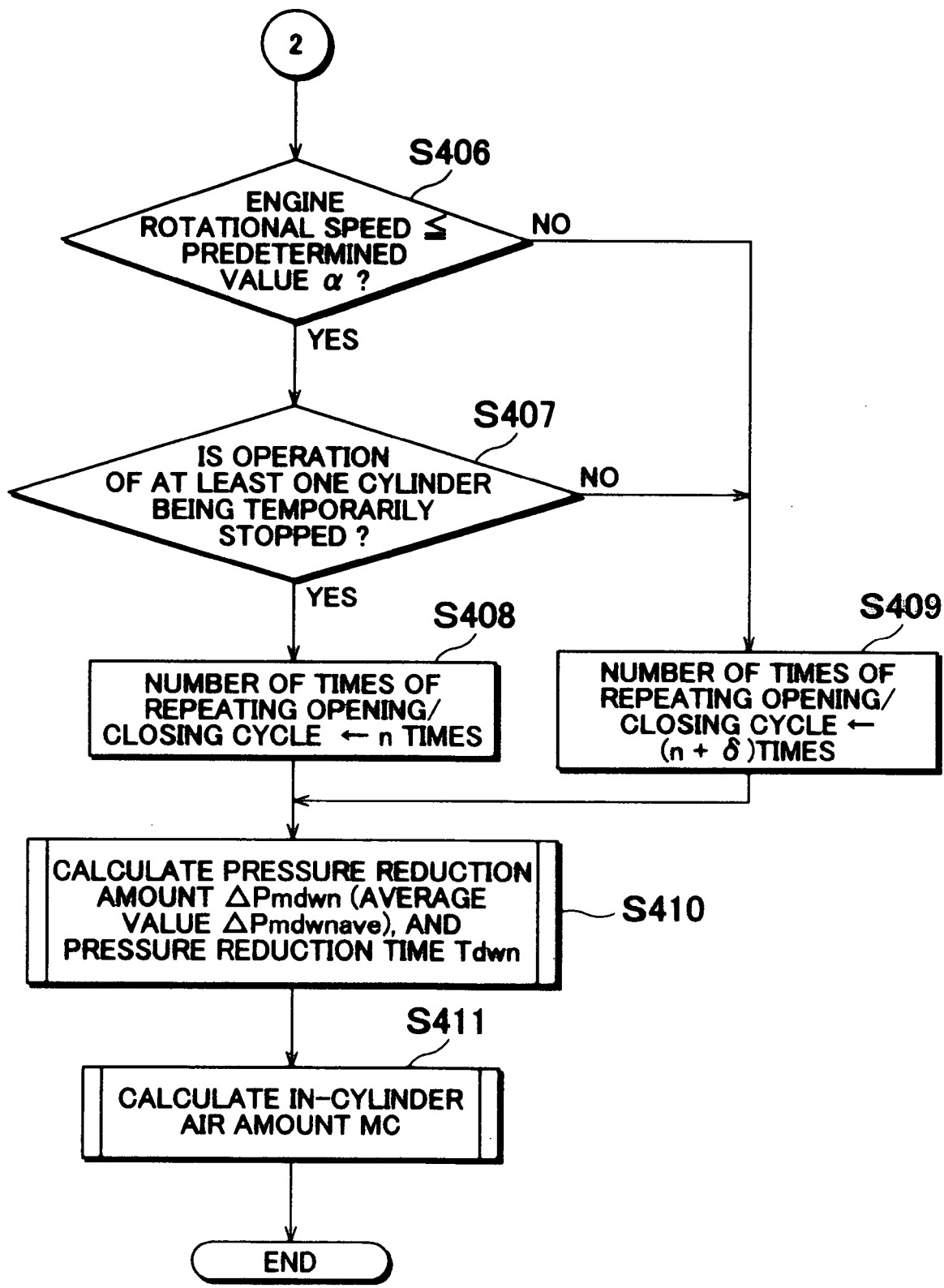
FIG. 12 is a second half of the flowchart showing the procedure for calculating the pressure reduction amount $\Delta Pmdwn$ for calculating the excess air amount (the average value $\Delta Pmdwnave$), and the procedure for calculating the pressure reduction time $\Delta Tdwn$ required for reducing the intake pipe pressure Pm by the pressure reduction amount $\Delta Pmdwn$ in the second embodiment.

FIG. 11 and FIG. 12 are flowcharts showing an in-cylinder air amount estimation routine according to the second embodiment. The in-cylinder air amount estimation routine according to the second embodiment is different from the in-cylinder air amount estimation routine according to the first embodiment only in processes (in steps S408 to S410) corresponding to the processes in steps S108 and S109 in the routine according to the first embodiment (FIG. 5).

In steps S401 to S405 (FIG. 1) in the in-cylinder air amount estimation routine shown in FIG. 11 and FIG. 12, the valve opening time ivo and the valve closing time ivc are obtained, and the average value mtave of the inflow flow rate mt and the average value Tmave of the intake pipe temperature Tm are calculated. Subsequently, in steps S406 and S407 in FIG. 12, it is determined whether the ratio of the length of the pulsation cycle of the pressure in the intake pipe 3 to the length of the sampling cycle X1 is less than the predetermined level.

When it is determined that the ratio of the length of the pulsation cycle to the length of the sampling cycle X1 is equal to or greater than the predetermined level (i.e., affirmative determinations are made both in step S406 and step S407), the number of times of repeating the opening/closing cycle for obtaining the average value ΔPmdwnave is set to, for example, "n" as in the averaging method with ordinary accuracy in the first embodiment (S408). When it is determined that the ratio of the length of the pulsation cycle to the sampling cycle X1 is less than the predetermined level (a negative determination is made in at least one of step S406 and step S407), the number of times of repeating the opening/closing cycle is set to a value which is greater than "n", for example, "n+δ" (S409). Then, the average value ΔPmdwnave is obtained by averaging the pressure reduction amounts ΔPmdwn obtained while the opening/closing cycle is repeated the number of times thus set, and the pressure reduction time ΔTdwn in the present opening/closing cycle is calculated (S410). The average value ΔPmdwnave and the pressure reduction time ΔTdwn are calculated, for example, according to the same procedure as the procedure of the ordinary accuracy calculation process in the first embodiment. The average value ΔPmdwnave that is calculated in this process is used as the pressure reduction amount ΔPmdwn for calculating the excess air amount.

Then, the in-cylinder air amount MC is calculated according to the equation (5) based on the valve opening time ivo, the valve closing time ivc, the average value mtave of the inflow flow rate mt, the average value Tmave of the intake pipe temperature Tm, the pressure reduction amount ΔPmdwn (the average value ΔPmdwnave), and pressure reduction time ΔTdwn (S411).

According to the second embodiment, the following effects can be obtained, in addition to the effects described in (1) and (2) that are obtained according to the first embodiment.

(4) The number of times of repeating the opening/closing cycle for obtaining the pressure reduction amount ΔPmdwn for calculating the excess air amount (the average value ΔPmdwnave) is changed according to the ratio of the length of the pulsation cycle of the pressure in the intake pipe 3 to the length of the sampling cycle X1. More specifically, when it is determined that the length of the pulsation cycle is less than the predetermined level, the number of times of repeating the opening/closing cycle is set to "n+δ" which is greater than the number "n" to which the number of times of repeating the opening/closing cycle is set when it is determined that the length of the pulsation cycle is equal to or greater than the predetermined level. When the number of times of repeating the opening/closing cycle is increased, it becomes easy to ensure necessary accuracy of the average value ΔPmdwnave which is used as the pressure reduction amount ΔPmdwn for calculating the excess air amount. On the other hand, the calculation load is inevitably increased when the average value ΔPmdwnave is calculated, and the amount of used memory is inevitably increased since data necessary for the calculation is stored. However, since the number of times of repeating the opening/closing cycle is increased only when the ratio of the length of the pulsation cycle to the length of the sampling cycle X1 is less than the predetermined level, it is possible to ensure necessary accuracy of the pressure reduction amount ΔPmdwn for calculating the excess air amount, and to minimize the increase in the calculation load and the increase in the amount of used memory.

Next, a third embodiment of the invention will be described with reference to FIG. 13 to FIG. 17. In this embodiment, the length of the sampling cycle X1 is changed according to the ratio of the length of the pulsation cycle of the pressure in the intake pipe 3 to the length of the sampling cycle X1, thereby ensuring necessary accuracy of the pressure reduction amount ΔPmdwn for calculating the excess air amount (the average value ΔPmdwnave).

Figure 13:
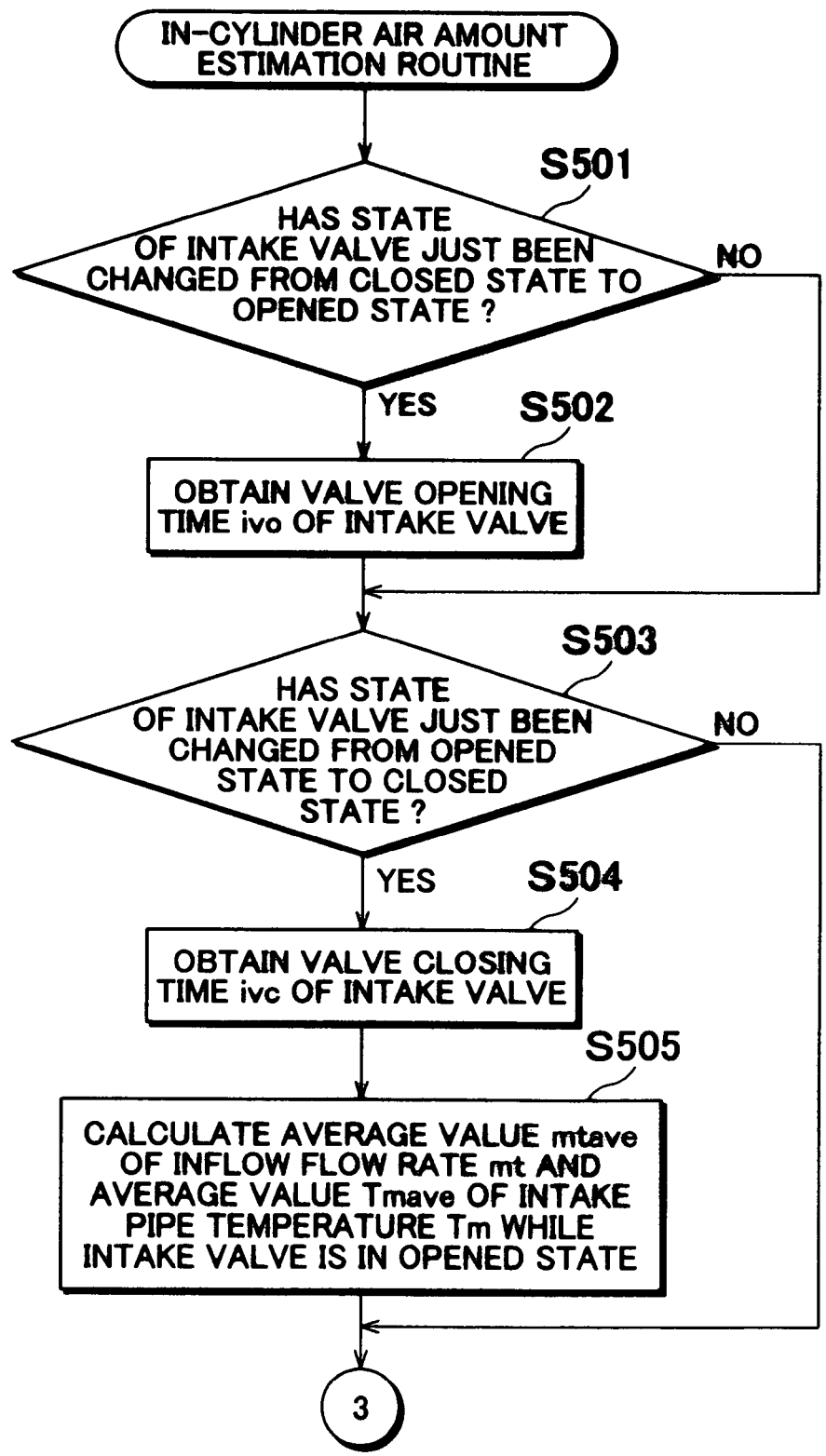
FIG. 13 a first half of a flowchart showing a procedure for calculating the pressure reduction amount $\Delta Pmdwn$ for calculating the excess air amount (the average value $\Delta Pmdwnave$), and a procedure for calculating the pressure reduction time ΔTdwn required for reducing the intake pipe pressure Pm by the pressure reduction amount ΔPmdwn in a third embodiment.
Figure 14:
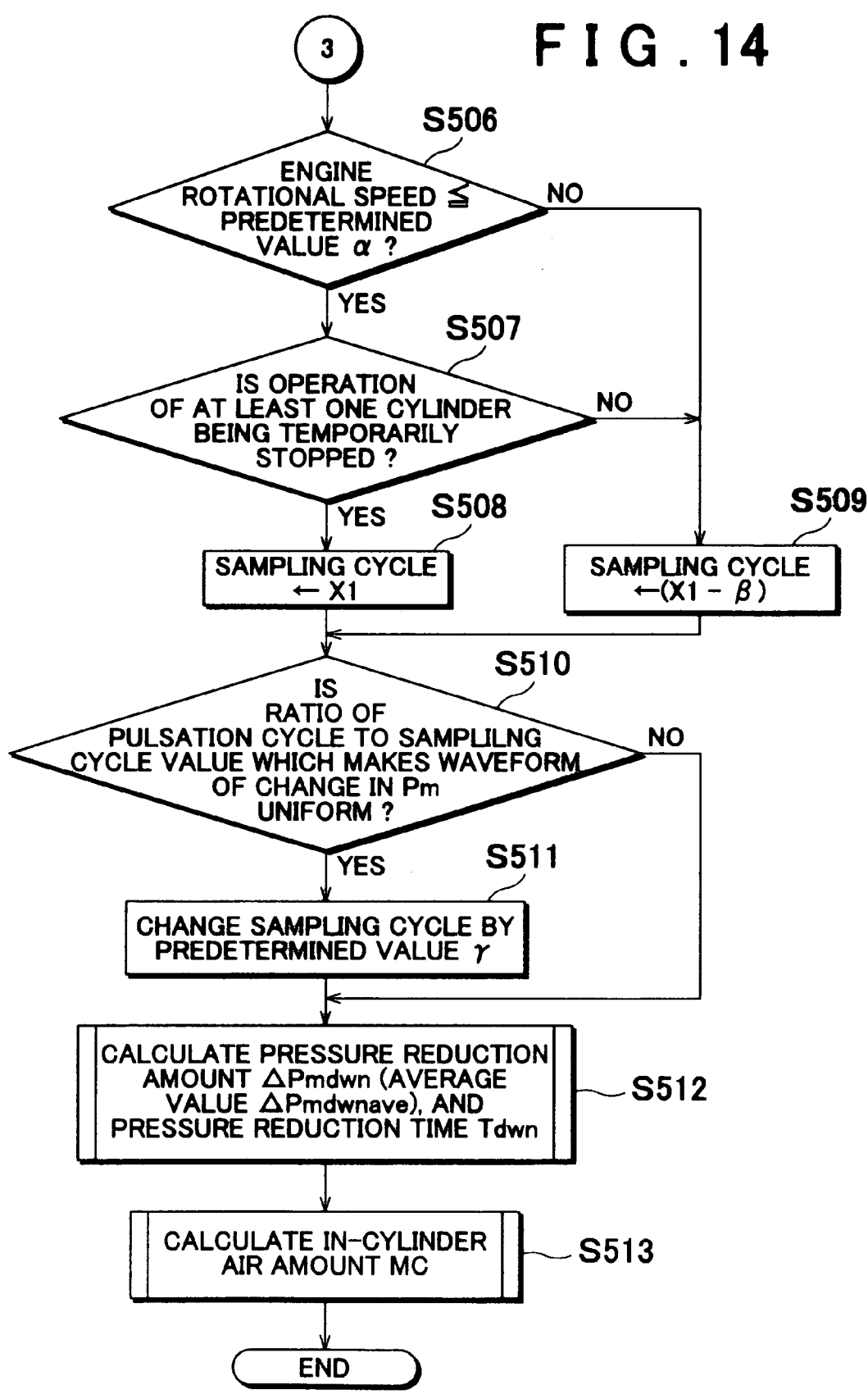
FIG. 14 is a second half of the flow chart showing the procedure for calculating the pressure reduction amount ΔPmdwn for calculating the excess air amount (the average value ΔPmdwnave), and the procedure for calculating the pressure reduction time ΔTdwn required for reducing the intake pipe pressure Pm by the pressure reduction amount ΔPmdwn in the third embodiment.

FIG. 13 and FIG. 14 are flowcharts showing an in-cylinder air amount estimation routine according to the third embodiment. The in-cylinder air amount estimation routine according to the third embodiment is different from the in-cylinder air amount estimation routine according to the first embodiment only in processes (in steps S508 to S512) corresponding to the processes in steps S108 and S109 in the routine according to the first embodiment (FIG. 5).

In steps S501 to S505 (FIG. 13) in the in-cylinder air amount estimation routine shown in FIG. 13 and FIG. 14, the valve opening time ivo and the valve closing time ivc are obtained, and the average value mtave of the inflow flow rate mt and the average value Tmave of the intake pipe temperature Tm are calculated. Subsequently, in steps S506 and S507 in FIG. 14, it is determined whether the ratio of the length of the pulsation cycle of the pressure in the intake pipe 3 to the length of the sampling cycle X1 is less than the predetermined level.

When it is determined that the ratio of the length of the pulsation cycle to the sampling cycle X1 is equal to or greater than the predetermined level (affirmative determinations are made both in step S506 and step S507), the length of the sampling cycle is set to, for example the same value (X1) as in the first embodiment (S508). When it is determined that the ratio of the length of the pulsation cycle to the sampling cycle X1 is less than the predetermined level (a negative determination is made in one of step S506 and step S507), the length of the sampling cycle is set to a value that is less than the value in the first embodiment, for example, "X1−β" (S509). When the ratio of the length of the pulsation cycle to the sampling cycle X1 is less than the predetermined level, the length of the sampling cycle X1 is decreased in this manner, whereby it is possible to suppress a decrease in the number of times of performing sampling during one opening/closing cycle of the intake valve 9. Accordingly, it is possible to reduce the possibility that it becomes difficult to ensure necessary accuracy of the pressure reduction amount ΔPmdwn for calculating the excess air amount (the average value ΔPmdwnave) due to a decrease in the number of times of performing sampling.

Figure 15:
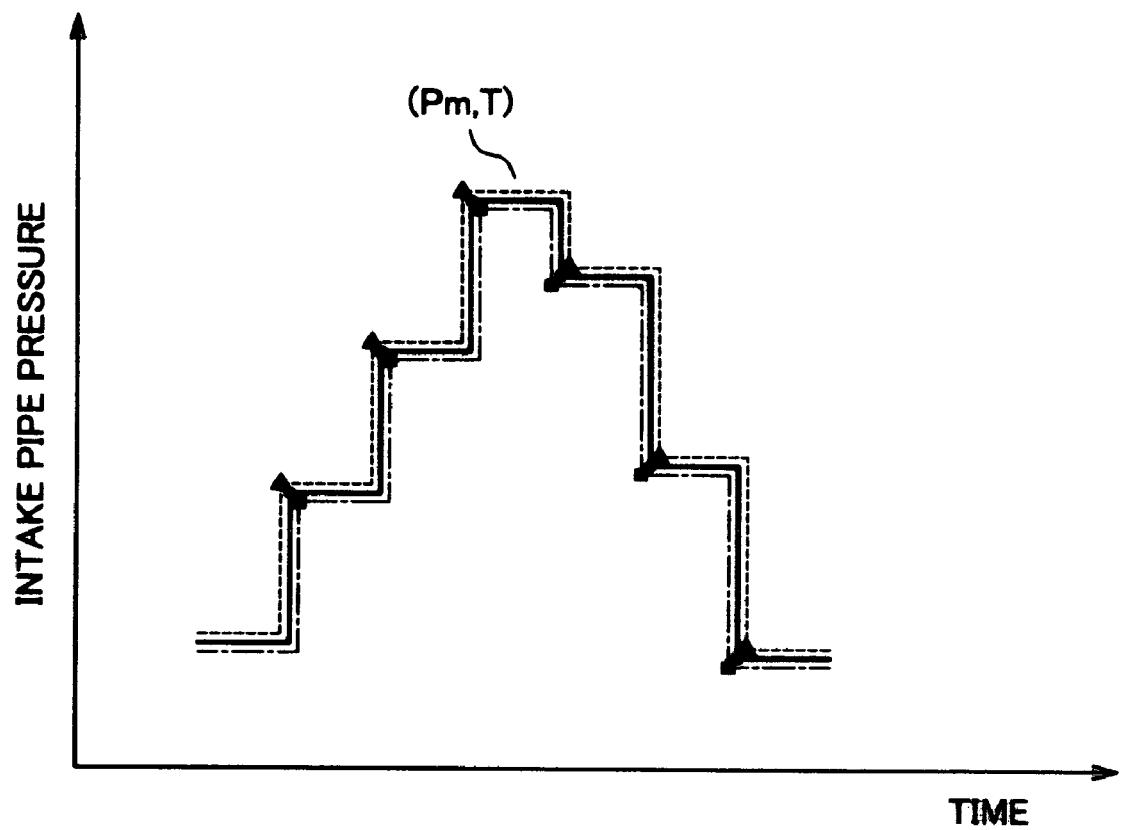
FIG. 15 is a time chart schematically showing a state where a waveform the change in the intake pipe pressure Pm during each opening/closing cycle is uniform while the opening/closing cycle is repeated plural times.

Ordinarily, the change in the intake pipe pressure Pm obtained by performing quantization of the output of the pressure sensor 22 in a predetermined sampling cycle differs from one opening/closing cycle of the intake valve 9 to another (i.e., a waveform of the change in the intake pipe pressure Pm during each opening/closing cycle becomes non-uniform), due to a difference in the waveform of the output of the pressure sensor 22 from one opening/closing cycle to another. However, the waveform of the change in the intake pipe pressure Pm during each opening/closing cycle may become uniform as shown in FIG. 15, while the opening/closing cycle is repeated plural times (in the case of FIG. 15, the opening/closing cycle is repeated three times), irrespective of the difference in the waveform of the output of the pressure sensor 22 from one opening/closing cycle to another. In other words, no matter how long the length of the sampling cycle is, there is a length of the pulsation cycle which makes the waveform of the change in the intake pipe pressure Pm during each opening/closing cycle uniform while the opening/closing cycle is repeated plural times, irrespective of the difference in the waveform of the output of the pressure sensor 22 from one opening/closing cycle to another. In a case where the waveform of the change in the intake pipe pressure Pm during each opening/closing cycle of the intake valve 9 is uniform while the opening/closing cycle is repeated plural times, it is difficult to ensure necessary accuracy of the pressure reduction amount ΔPmdwn for calculating the excess air amount, even if the average value ΔPmdwnave is obtained by averaging the pressure reduction amounts ΔPmdwn in plural opening/closing cycles, and the average value ΔPmdwnave is used as the pressure reduction amount ΔPmdwn for calculating the excess air amount.

Figure 16:
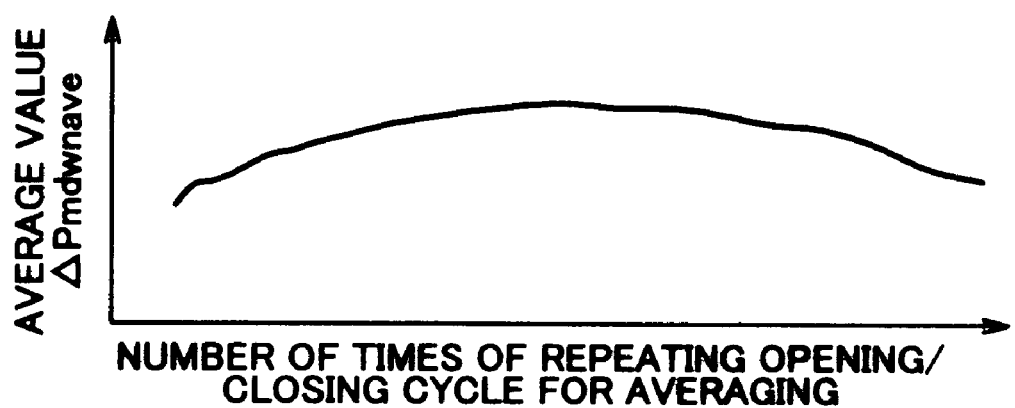
FIG. 16 is a graph showing how the average value ΔPmdwnave is changed as the number of times of repeating the opening/closing cycle for obtaining the average value ΔPmdwnave is increased in a case where the waveform of the change in the intake pipe pressure Pm during each opening/closing cycle is non-uniform while the opening/closing cycle is repeated plural times.
Figure 17:
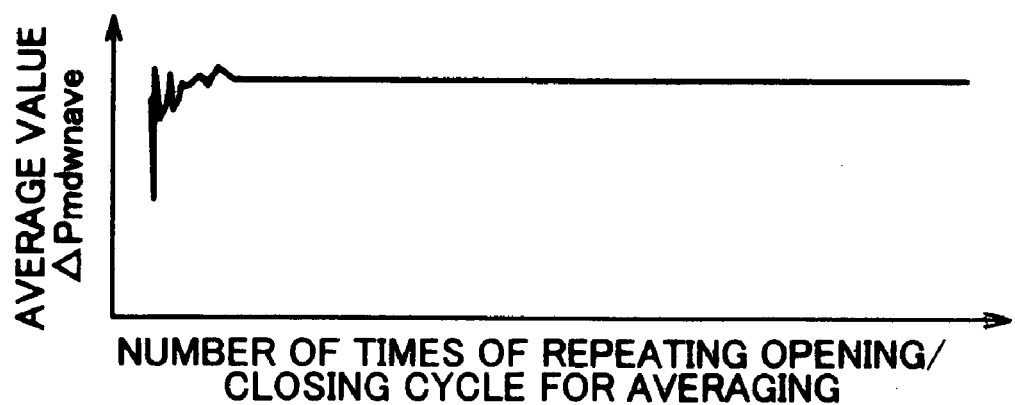
FIG. 17 is a graph showing how the average value ΔPmdwnave is changed as the number of times of repeating the opening/closing cycle for obtaining the average value ΔPmdwnave is increased in a case where the waveform of the change in the intake pipe pressure Pm during each opening/closing cycle is uniform while the opening/closing cycle is repeated plural times.

Hereinafter, description will be made of a difference in the pressure reduction amount ΔPmdwn for calculating the excess air amount (the average value ΔPmdwnave) between when the waveform of the change in the intake pipe pressure Pm during each opening/closing cycle is uniform while the opening/closing cycle is repeated plural times, and when the waveform of the change in the intake pipe pressure Pm during each opening/closing cycle is non-uniform while the opening/closing cycle is repeated plural times, with reference to FIG. 16 and FIG. 17. FIG. 16 and FIG. 17 show how the average value ΔPmdwnave is changed as the number of times of repeating the opening/closing cycle for obtaining the average value ΔPmdwnave is increased. FIG. 16 shows the case where the waveform of the change in the intake pipe pressure Pm during each opening/closing cycle is uniform while the opening/closing cycle is repeated plural times. FIG. 17 shows the case where the waveform of the change in the intake pipe pressure Pm during each opening/closing cycle is non-uniform while the opening/closing cycle is repeated plural times.

In the case where the waveform of the change in the intake pipe pressure Pm during each opening/closing cycle is non-uniform while the opening/closing cycle is repeated plural times (FIG. 17), the average value ΔPmdwnave becomes close to a certain value as the number of times of repeating the opening/closing cycle for obtaining the average value ΔPmdwnave is increased. Meanwhile, in the case where the waveform of the change in the intake pipe pressure Pm during each opening/closing cycle is uniform while the opening/closing cycle is repeated plural times (FIG. 16), the average value ΔPmdwnave fluctuates, and does not close to a certain value even if the number of times of repeating the opening/closing cycle for obtaining the average value ΔPmdwnave is increased. This signifies that the accuracy of the average value ΔPmdwnave is not increased even if the number of times of repeating the opening/closing cycle for obtaining the average value ΔPmdwnave is increased. Accordingly, even if the average value ΔPmdwnave is used as the pressure reduction amount ΔPmdwn for calculating the excess air amount, it becomes difficult to ensure necessary accuracy of the pressure reduction amount ΔPmdwn for calculating the excess air amount.

In step S510 in the in-cylinder air amount estimation routine (FIG. 14), it is determined whether the ratio of the length of the pulsation cycle to the length of the present sampling cycle which is variably set as described above is a value which makes the waveform of the change in the intake pipe pressure Pm during each opening/closing cycle uniform while the opening/closing cycle is repeated plural times as described above. This determination is made, for example, based on whether the engine rotational speed is a value in a predetermined range where the ratio of the length of the pulsation cycle to the sampling cycle makes the waveform of the change in the intake pipe pressure Pm during each opening/closing cycle uniform while the opening/closing cycle is repeated plural times. This predetermined range is variably set, based on the present length of sampling cycle and the present number of cylinders whose operation is temporarily stopped, so as to be suitable for making the aforementioned determination.

When an affirmative determination is made in step S510, the length of the sampling cycle is changed, for example, by a predetermined value γ (S511). Thus, it is possible to prevent the waveform of the change in the intake pipe pressure Pm during each opening/closing cycle from becoming uniform while the opening/closing cycle is repeated plural times, and to ensure necessary accuracy of the pressure reduction amount ΔPmdwn for calculating the excess air amount (the average value ΔPmdwnave). At this time, the length of the sampling cycle may be decreased or increased by the predetermined value γ. However, in order to maximize the number of times of performing sampling in one opening/closing cycle, it is preferable to decrease the length of the sampling cycle. For example, the predetermined value γ is set to a value equivalent to the minimum change amount by which the length of the sampling cycle needs to be changed for making the waveform of the change in the intake pipe pressure Pm during each opening/closing cycle non-uniform while the opening/closing cycle is repeated plural times.

In step S512, the average value ΔPmdwnave is obtained by averaging the pressure reduction amounts ΔPmdwn in plural opening/closing cycles of the intake valve 9 (for example, "n" opening/closing cycles ("n" is a number equal to or greater than 2)). In addition, the pressure reduction time ΔTdwn in the present opening/closing cycle is calculated. The average value ΔPmdwnave and the pressure reduction time ΔTdwn, for example, according to the same procedure as the procedure of the ordinary accuracy calculation process in the first embodiment. The average value ΔPmdwnave calculated through this process is used as the pressure reduction amount ΔPmdwn for calculating the excess air amount.

Then, the in-cylinder air amount MC is calculated using the equation (5) based on the valve opening time ivo, the valve closing time ivc, the average value mtave of the inflow flow rate mt, the average value Tmave of the intake pipe temperature Tm, the pressure reduction amount ΔPmdwn (the average value ΔPmdwnave), and the pressure reduction time ΔTdwn (S513).

According to the third embodiment, it is possible to obtain the following effects, in addition to the effects described in (1) and (2) that are obtained according to the first embodiment.

(5) The length of the sampling cycle is changed according to the ratio of the length of the pulsation cycle of the pressure in the intake pipe 3 to the length of the sampling cycle X1. More specifically, when the ratio of the length of the pulsation cycle to the length of the sampling cycle is less than the predetermined level, the length of the sampling cycle is set to the value (X1−β) which is less than the value (X1) to which the length of the sampling cycle is set when the ratio of the length of the pulsation cycle to the length of the sampling cycle is equal to or greater than the predetermined level. Since the length of the sampling cycle is decreased in this manner, it is possible to prevent the length of the pulsation cycle from becoming excessively close to the length of the sampling cycle, and to increase the number of times of performing sampling in one opening/closing cycle. Therefore, it is possible to reduce the possibility that it becomes difficult to ensure necessary accuracy of the pressure reduction amount ΔPmdwn for calculating the excess air amount (the average value ΔPmdwnave) due to a decrease in the number of times of performing sampling during one opening/closing cycle. However, when the number of times of performing sampling during one opening/closing cycle is increased, the calculation load of the CPU for calculating the average value ΔPmdwnave is inevitably increased. Considering this, the length of the sampling cycle is decreased and the number of times of performing sampling is increased only when it is determined that the ratio of the length of the pulsation cycle to the length of the sampling cycle is less than the predetermined level. Thus, it is possible to ensure necessary accuracy of the average value ΔPmdwnave, and to minimize the increase in the calculation load.

(6) When it is determined that the ratio of the length of the pulsation cycle to the length of the sampling cycle which is variably set as described above is the value which makes the waveform of the change in the intake pipe pressure Pm during each opening/closing cycle uniform while the opening/closing cycle is repeated plural times, the length of the sampling cycle is changed by the predetermined value γ. Thus, it is possible to prevent the waveform of the change in the intake pipe pressure Pm during each opening/closing cycle from becoming uniform while the opening/closing cycle is repeated plural times. Accordingly, it is possible to reduce the possibility that it becomes difficult to ensure necessary accuracy of the pressure reduction amount ΔPmdwn for calculating the excess air amount (the average value ΔPmdwnave) as the result of the waveform of the change in the intake pipe pressure Pm during each opening/closing cycle becoming uniform while the opening/closing cycle is repeated plural times.

Next, a fourth embodiment of the invention will be described with reference to FIG. 18 and FIG. 19. In this embodiment, when the waveform of the change in the intake pipe pressure Pm during each opening/closing cycle is uniform while the opening/closing cycle is repeated plural times, the pressure reduction amount ΔPmdwn of the intake pipe pressure Pm in the present opening/closing cycle is not calculated, instead of changing the length of the sampling cycle by the predetermined value γ as in the third embodiment. In this case, the pressure reduction amount ΔPmdwn for calculating the excess air amount (the average value ΔPmdwnave) is calculated based on data relating to the pressure reduction amounts ΔPmdwn which are obtained and stored in the RAM while the opening/closing cycle is repeated the recent "n" times, exclusive of the pressure reduction amount ΔPmdwn in the present opening/closing cycle.

Figure 18:
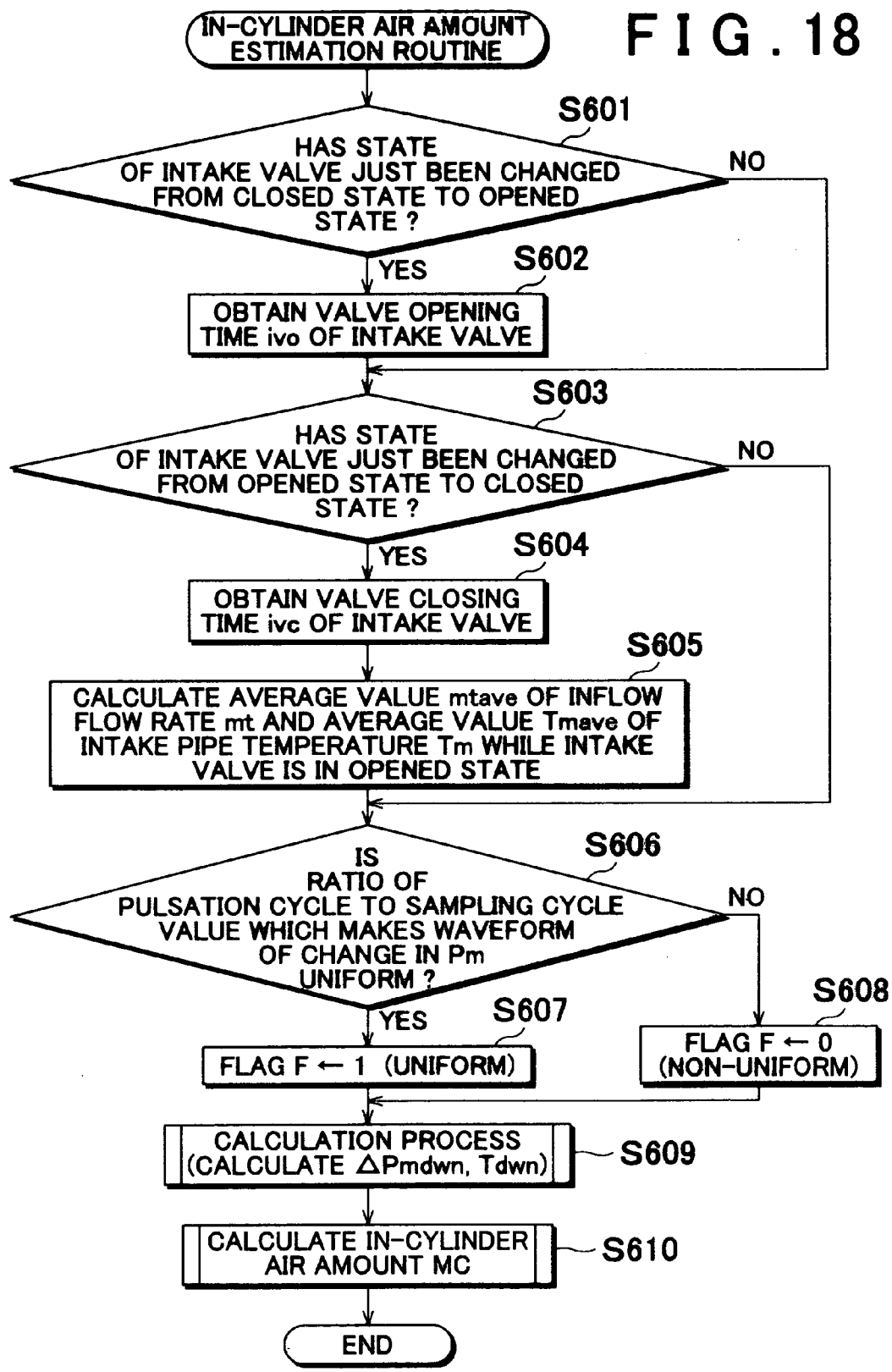
FIG. 18 is a flowchart showing a procedure for calculating the in-cylinder air amount in a fourth embodiment.

FIG. 18 is a flowchart showing an in-cylinder air amount estimation routine according to the fourth embodiment. The in-cylinder air amount estimation routine according to the fourth embodiment is different from the in-cylinder air amount estimation routine according to the third embodiment only in processes (in steps S606 to S608) corresponding to the processes in steps S506 to S511 in the routine according to the third embodiment (FIG. 14).

In steps S601 to S605 in the in-cylinder air amount estimation routine shown in FIG. 18, the valve opening time ivo and the valve closing time ivc are obtained, and the average value mtave of the inflow flow rate mt and the average value Tmave of the intake pipe temperature Tm are calculated. Subsequently, in step S606, it is determined whether the ratio of the length of the pulsation cycle to the length of the sampling cycle X1 is the value which makes the waveform of the change in the intake pipe pressure Pm during each opening/closing cycle uniform while the opening/closing cycle is repeated plural times. When an affirmative determination is made in step S606, a flag F is set to 1 (uniform) in step S607. The flag F is for determining whether the waveform of the change in the intake pipe pressure Pm during each opening/closing cycle is uniform while the opening/closing cycle is repeated plural times. When a negative determination is made in step S606, the flag F is set to 0 (non-uniform) in step S608.

Subsequently, in the calculation process in step S609, the pressure reduction amount ΔPmdwn for calculating the excess air amount (the average value ΔPmdwnave) is obtained, and the pressure reduction time ΔTdwn in the present opening/closing cycle is calculated. Then, the in-cylinder air amount MC is calculated using the equation (5) based on the valve opening time ivo, the valve closing time ivc, the average value mtave of the inflow flow rate mt, the average value Tmave of the intake pipe temperature Tm, the pressure reduction amount ΔPmdwn (the average value ΔPmdwnave), and the pressure reduction time ΔTdwn (S610).

Figure 19:
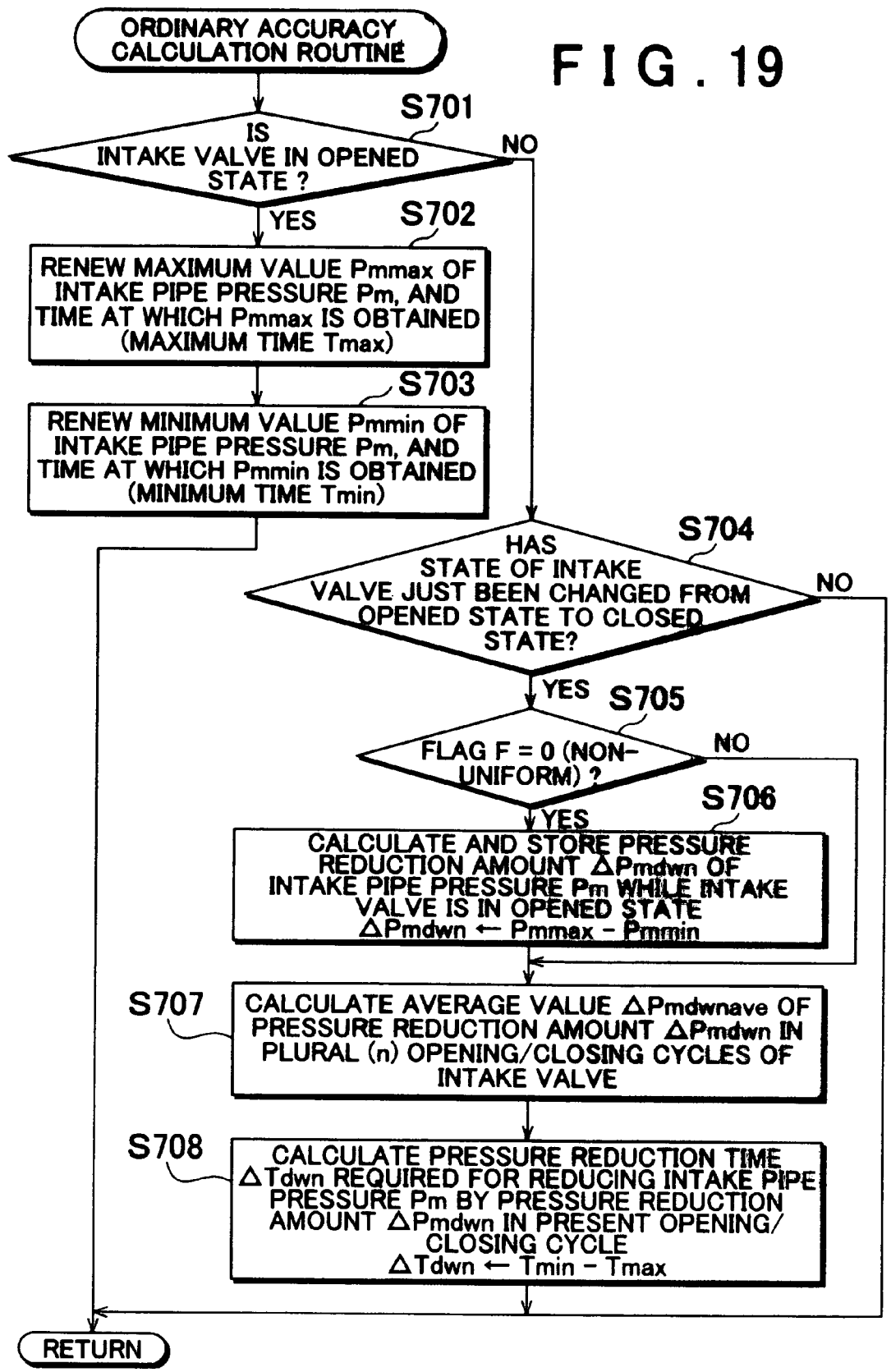
FIG. 19 is a flow chart showing a procedure for calculating the pressure reduction amount ΔPmdwn for calculating the excess air amount (the average value ΔPmdwnave), and a procedure for calculating the pressure reduction time ΔTdwn required for reducing the intake pipe pressure Pm by the pressure reduction amount ΔPmdwn in the fourth embodiment.

Next, the calculation process in step S609 will be described in detail, with reference to a flowchart in FIG. 19 showing the calculation process routine. This routine is performed through the electronic control unit 15 every time the in-cylinder air amount estimation routine (FIG. 18) proceeds to step S609.

This calculation process routine is different from the ordinary accuracy calculation routine (FIG. 6) in the first embodiment only in processes (in steps S705 to S707) corresponding to the processes in steps S205 and S206 in the ordinary accuracy calculation routine in the first embodiment.

In the calculation process routine shown in FIG. 19, the maximum value Pmmax and the maximum time Tmax are renewed (S702) while the intake valve 9 is in the opened state (i.e., when an affirmative determination is made in step S701). In addition, the minimum value Pmmin and the minimum time Tmin are renewed (S703). Also, when the state of the intake valve 9 has just been changed from the opened state to the closed state (i.e., when an affirmative determination is made in step S704), it is determined whether the flag F is set to 0 (non-uniform) in step S705).

When an affirmative determination is made in step S705, the pressure reduction amount ΔPmdwn of the intake pipe pressure Pm is calculated by obtaining the difference between the maximum value Pmmax and the minimum value Pmmin that are stored, and the calculated pressure reduction amount ΔPmdwn is stored in the RAM (S706). Subsequently, the average value ΔPmdwnave, which is used as the pressure reduction amount ΔPmdwn for calculating the excess air amount, is calculated based on the pressure reduction amounts ΔPmdwn which are obtained while the opening/closing cycle is repeated the recent n times, inclusive of the pressure reduction amount ΔPmdwn in the present opening/closing cycle (S707).

When a negative determination is made in step S705, and the flag F is set to 1 (uniform), the process in step S706 is skipped, and the pressure reduction amount ΔPmdwn of the intake pipe pressure Pm in the present opening/closing cycle is not calculated, and is not stored in the RAM. In this case, in step S707, the average value ΔPmdwnave is calculated based on the pressure reduction amounts ΔPmdwn which are obtained while the opening/closing cycle is repeated the recent n times, exclusive of the pressure reduction amount ΔPmdwn in the present opening/closing cycle (S707).

Subsequently, in step S708, the pressure reduction time ΔTdwn required for reducing the intake pipe pressure Pm by the pressure reduction amount ΔPmdwn in the present cycle is calculated by obtaining the difference between the minimum time Tmin and the maximum time Tmax that are stored in steps S702 and S703.

According to the fourth embodiment, it is possible to obtain the following effects, in addition to the effects described in (1) and (2), that are obtained according to the first embodiment.

(7) In the case where the waveform of the change in the intake pipe pressure Pm during each opening/closing cycle is uniform while the opening/closing cycle is repeated plural times, it is difficult to ensure necessary accuracy of the pressure reduction amount ΔPmdwn for calculating the excess air amount (the average value ΔPmdwnave). Therefore, when it is determined that the ratio of the length of the pulsation cycle to the length of the sampling cycle is the value which makes the waveform of the change in the intake pipe pressure Pm during each opening/closing cycle uniform while the opening/closing cycle is repeated plural times, the pressure reduction amount ΔPmdwn of the intake pipe pressure Pm in the present opening/closing cycle is not calculated. Further, the average value ΔPmdwnave is obtained based on the pressure reduction amounts ΔPmdwn of the intake pipe pressure Pm which are obtained while the opening/closing cycle is repeated recent plural times, exclusive of the pressure reduction amount ΔPmdwn in the present opening/closing cycle. Thus, the average value ΔPmdwnave is calculated without using the pressure reduction amount Pmdwn of the intake pipe pressure Pm in the present opening/closing cycle when the waveform of the change in the intake pipe pressure Pm during each opening/closing cycle becomes uniform while the opening/closing cycle is repeated plural times. Accordingly, by using the aforementioned average value ΔPmdwnave as the pressure reduction amount ΔPmdwn for calculating the excess air amount, it is possible to reduce the possibility that it becomes difficult to ensure necessary accuracy of the pressure reduction amount ΔPmdwn.

For example, each of the aforementioned embodiments may be modified as follows. In each of the second embodiment to the fourth embodiment, the average value ΔPmdwnave may be obtained using the averaging method with high accuracy described in the first embodiment.

In the third embodiment, as the predetermined value γ, a larger value may be employed. The invention may be applied to an engine in which operation of the cylinder is not temporarily stopped. In this case, the determination on whether the operation of at least one cylinder is being temporarily stopped (steps S107, S407, S507) is omitted in the in-cylinder air amount calculation routine.

The invention is not limited to the averaging method with high accuracy in the first embodiment. It is possible to employ other methods by which the average value ΔPmdwnave can be obtained with high accuracy as compared to the averaging method with ordinary accuracy.

In the third embodiment, it is possible to omit the process of determining whether the ratio of the length of the pulsation cycle to the length of the sampling cycle is the value which makes the waveform of the change in the intake pipe pressure Pm during each opening/closing cycle uniform while the opening/closing cycle is repeated plural times (S510), and the process of changing the length of the sampling cycle by the predetermined value γ when an affirmative determination is made in step S510 (S511). In this case as well, the effect similar to the effect described in (5) can be obtained.

In the third embodiment, it is possible to omit the process of determining whether the ratio of the length of the pulsation cycle to the length of the sampling cycle X1 is less than the predetermined level (steps S506 and S507), and the process of decreasing the length of the sampling cycle when affirmative determinations are made both in step S506 and step S507 (S509). In this case as well, the effect similar to the effect described in (6) can be obtained.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. An in-cylinder air amount estimation apparatus which is applied to an internal combustion engine where pulsation of a pressure occurs in an intake pipe due to opening/closing of an intake valve, and which calculates an inflow air amount that is an amount of air flowing into the intake pipe, and estimates an in-cylinder air amount using the inflow air amount, comprising:
   a reduction amount calculation device which performs quantization of an output of a pressure sensor for detecting the pressure in the intake pipe using analogue to digital conversion in a predetermined sampling cycle, and calculates a pressure reduction amount that is an amount of reduction in the pressure in the intake pipe due to opening of the intake valve using a value obtained by the quantization as the pressure in the intake pipe;
   an excess air amount calculation device which calculates an excess air amount that is an amount of air charged into a cylinder due to the pulsation of the pressure, based on the pressure reduction amount; and
   an in-cylinder air amount estimation device which estimates the in-cylinder air amount based on the inflow air amount and the excess air amount, wherein the reduction amount calculation device calculates, as the pressure reduction amount for calculating the excess air amount, an average value of the pressure reduction amount in plural opening/closing cycles of the intake valve; and the reduction amount calculation device obtains the average value of the pressure reduction amount using an averaging method with high accuracy in a case where a ratio of a length of a pulsation cycle of the pressure to a length of the sampling cycle for the analogue to digital conversion is less than a predetermined level, as compared to a case where the ratio of the length of the pulsation cycle of the pressure to the length of the sampling cycle for the analogue to digital conversion is equal to or greater than the predetermined level.

2. The in-cylinder air amount estimation apparatus according to claim 1, wherein in a case where the ratio of the length of the pulsation cycle of the pressure to the length of the sampling cycle is equal to or greater than the predetermined level, the reduction amount calculation device calculates, as the pressure reduction amount in each opening/closing cycle of the intake valve, a difference between a maximum value and a minimum value of the pressure while the intake valve is in an opened state using the pressure obtained by the quantization, the reduction amount calculation device stores the pressure reduction amount in each opening/closing cycle in memory, and the reduction amount calculation device calculates, as the pressure reduction amount for calculating the excess air amount, the average value of the pressure reduction amount by averaging the pressure reduction amounts in the plural opening/closing cycles; and in a case where the ratio of the length of the pulsation cycle of the pressure to the length of the sampling cycle is less than the predetermined level, the reduction amount calculation device stores, in the memory, the pressure obtained by the quantization in each sampling cycle and a time at which the pressure is obtained by the quantization in each sampling cycle, the reduction amount calculation device obtains an average waveform of the pressure in one opening/closing cycle based on data relating to the pressures and the times which are obtained in the plural opening/closing cycles of the intake valve, and the reduction amount calculation device calculates a difference between a maximum value and a minimum value of the pressure in the average waveform as the average value of the pressure reduction amount in the plural opening/closing cycles, the average value being used as the pressure reduction amount for calculating the excess air amount.

3. An in-cylinder air amount estimation apparatus which is applied to an internal combustion engine where pulsation of a pressure occurs in an intake pipe due to opening/closing of an intake valve, and which calculates an inflow air amount that is an amount of air flowing into the intake pipe, and estimates an in-cylinder air amount using the inflow air amount, comprising:
   a reduction amount calculation device which performs quantization of an output of a pressure sensor for detecting the pressure in the intake pipe using analogue to digital conversion in a predetermined sampling cycle, and calculates a pressure reduction amount that is an amount of reduction in the pressure in the intake pipe due to opening of the intake valve using a value obtained by the quantization as the pressure in the intake pipe;
   an excess air amount calculation device which calculates an excess air amount that is an amount of air charged into a cylinder due to the pulsation of the pressure, based on the pressure reduction amount; and
   an in-cylinder air amount estimation device which estimates the in-cylinder air amount based on the inflow air amount and the excess air amount, wherein the reduction amount calculation device calculates, as the pressure reduction amount for calculating the excess air amount, an average value of the pressure reduction amount in plural opening/closing cycles of the intake valve; and the reduction amount calculation device changes a number of times of repeating the opening/closing cycle for obtaining the average value of the pressure reduction amount according to a ratio of a length of a pulsation cycle of the pressure to a length of the sampling cycle for the analogue to digital conversion.

4. An in-cylinder air amount estimation apparatus which is applied to an internal combustion engine where pulsation of a pressure occurs in an intake pipe due to opening/closing of an intake valve, and which calculates an inflow air amount that is an amount of air flowing into the intake pipe, and estimates an in-cylinder air amount using the inflow air amount, comprising:
  a reduction amount calculation device which performs quantization of an output of a pressure sensor for detecting the pressure in the intake pipe using analogue to digital conversion in a predetermined sampling cycle, and calculates a pressure reduction amount that is an amount of reduction in the pressure in the intake pipe due to opening of the intake valve using a value obtained by the quantization as the pressure in the intake pipe;
  an excess air amount calculation device which calculates an excess air amount that is an amount of air charged into a cylinder due to the pulsation of the pressure, based on the pressure reduction amount; and
  an in-cylinder air amount estimation device which estimates the in-cylinder air amount based on the inflow air amount and the excess air amount, wherein the reduction amount calculation device calculates, as the pressure reduction amount for calculating the excess air amount, an average value of the pressure reduction amount in plural opening/closing cycles of the intake valve; and the reduction amount calculation device changes a length of the sampling cycle for the analogue to digital conversion according to a ratio of a length of a pulsation cycle of the pressure to the length of the sampling cycle.

5. The in-cylinder air amount estimation apparatus according to claim 4, wherein the reduction amount calculation device decreases the length of the sampling cycle in a case where the ratio of the length of the pulsation cycle of the pressure to the length of the sampling cycle for the analogue to digital conversion is less than a predetermined level, as compared to a case where the ratio of the length of the pulsation cycle of the pressure to the length of the sampling cycle is equal to or greater than the predetermined level.

6. The in-cylinder air amount estimation apparatus according to claim 5, wherein the reduction amount calculation device sets the length of the sampling cycle to a value that is different from a value to which the length of the sampling cycle has been set in a case where it is determined that the ratio of the length of the pulsation cycle of the pressure to the length of the sampling cycle for the analogue to digital conversion is a value which makes a waveform of a change in the pressure in the intake pipe obtained by the quantization during each opening/closing cycle of the intake valve uniform.

7. The in-cylinder air amount estimation apparatus according to claim 4, wherein the reduction amount calculation device sets the length of the sampling cycle to a value that is different from a value to which the length of the sampling cycle has been set in a case where it is determined that the ratio of the length of the pulsation cycle of the pressure to the length of the sampling cycle for the analogue to digital conversion is a value which makes a waveform of a change in the pressure in the intake pipe obtained by the quantization during each opening/closing cycle of the intake valve uniform.

8. An in-cylinder air amount estimation apparatus which is applied to an internal combustion engine where pulsation of a pressure occurs in an intake pipe due to opening/closing of an intake valve, and which calculates an inflow air amount that is an amount of air flowing into the intake pipe, and estimates an in-cylinder air amount using the inflow air amount, comprising:
  a reduction amount calculation device which performs quantization of an output of a pressure sensor for detecting the pressure in the intake pipe using analogue to digital conversion in a predetermined sampling cycle, and calculates a pressure reduction amount that is an amount of reduction in the pressure in the intake pipe due to opening of the intake valve using a value obtained by the quantization as the pressure in the intake pipe;
  an excess air amount calculation device which calculates an excess air amount that is an amount of air charged into a cylinder due to the pulsation of the pressure, based on the pressure reduction amount; and
  an in-cylinder air amount estimation device which estimates the in-cylinder air amount based on the inflow air amount and the excess air amount, wherein the reduction amount calculation device calculates, as the pressure reduction amount for calculating the excess air amount, an average value of the pressure reduction amount in plural opening/closing cycles of the intake valve; and the reduction amount calculation device does not calculate the pressure reduction amount in the intake pipe in a present opening/closing cycle when it is determined that a ratio of a length of the pulsation cycle of the pressure to a length of the sampling cycle for the analogue to digital conversion is a value which makes a waveform of a change in the pressure in the intake pipe obtained by the quantization during each opening/closing cycle of the intake valve uniform.

9. An in-cylinder air amount estimation method which is applied to an internal combustion engine where pulsation of a pressure occurs in an intake pipe due to opening/closing of an intake valve, and in which an inflow air amount that is an amount of air flowing into the intake pipe is calculated, and an in-cylinder air amount is estimated using the inflow air amount, comprising the steps of:
  performing quantization of an output of a pressure sensor for detecting the pressure in the intake pipe using analogue to digital conversion in a predetermined sampling cycle, and calculating a pressure reduction amount that is an amount of reduction in the pressure in the intake pipe due to opening of the intake valve using a value obtained by the quantization as the pressure in the intake pipe, wherein an average value of the pressure reduction amount in plural opening/closing cycles of the intake valve is calculated as the pressure reduction amount for calculating the excess air amount, and the average value of the pressure reduction amount is obtained using an averaging method with high accuracy in a case where a ratio of a length of a pulsation cycle of the pressure to a length of the sampling cycle for the analogue to digital conversion is less than a predetermined level, as compared to a case where the ratio of the length of the pulsation cycle of the pressure to the length of the sampling cycle for the analogue to digital conversion is equal to or greater than the predetermined level;

calculating an excess air amount that is an amount of air charged into a cylinder due to the pulsation of the pressure, based on the pressure reduction amount; and estimating the in-cylinder air amount based on the inflow air amount and the excess air amount.

10. The in-cylinder air amount estimation method according to claim 9, wherein when the pressure reduction amount is calculated, in a case where the ratio of the length of the pulsation cycle of the pressure to the length of the sampling cycle is equal to or greater than the predetermined level, a difference between a maximum value and a minimum value of the pressure while the intake valve is in an opened state is calculated using the pressure obtained by the quantization, as the pressure reduction amount in each opening/closing cycle of the intake valve, the pressure reduction amount in each opening/closing cycle is stored in memory, and the average value of the pressure reduction amount is calculated by averaging the pressure reduction amounts in the plural opening/closing cycles, as the pressure reduction amount for calculating the excess air amount; and in a case where the ratio of the length of the pulsation cycle of the pressure to the length of the sampling cycle is less than the predetermined level, the pressure obtained by the quantization in each sampling cycle and a time at which the pressure is obtained by the quantization in each sampling cycle are stored in the memory, an average waveform of the pressure in one opening/closing cycle is obtained based on data relating to the pressures and the times which are obtained in the plural opening/closing cycles of the intake valve, and a difference between a maximum value and a minimum value of the pressure in the average waveform is calculated as the average value of the pressure reduction amount in the plural opening/closing cycle, the average value being used as the pressure reduction amount for calculating the excess air amount.

11. An in-cylinder air amount estimation method which is applied to an internal combustion engine where pulsation of a pressure occurs in an intake pipe due to opening/closing of an intake valve, and in which an inflow air amount that is an amount of air flowing into the intake pipe is calculated, and an in-cylinder air amount is estimated using the inflow air amount, comprising the steps of:

performing quantization of an output of a pressure sensor for detecting the pressure in the intake pipe using analogue to digital conversion in a predetermined sampling cycle, and calculating a pressure reduction amount that is an amount of reduction in the pressure in the intake pipe due to opening of the intake valve using a value obtained by the quantization as the pressure in the intake pipe, wherein an average value of the pressure reduction amount in plural opening/closing cycles of the intake valve is calculated as the pressure reduction amount for calculating the excess air amount, and a number of times of repeating the opening/closing cycle for obtaining the average value of the pressure reduction amount is changed according to a ratio of a length of a pulsation cycle of the pressure to a length of the sampling cycle for the analogue to digital conversion;

calculating an excess air amount that is an amount of air charged into a cylinder due to the pulsation of the pressure, based on the pressure reduction amount; and estimating the in-cylinder air amount based on the inflow air amount and the excess air amount.

12. An in-cylinder air amount estimation method which is applied to an internal combustion engine where pulsation of a pressure occurs in an intake pipe due to opening/closing of an intake valve, and in which an inflow air amount that is an amount of air flowing into the intake pipe is calculated, and an in-cylinder air amount is estimated using the inflow air amount, comprising the steps of:

performing quantization of an output of a pressure sensor for detecting the pressure in the intake pipe using analogue to digital conversion in a predetermined sampling cycle, and calculating a pressure reduction amount that is an amount of reduction in the pressure in the intake pipe due to opening of the intake valve using a value obtained by the quantization as the pressure in the intake pipe, wherein an average value of the pressure reduction amount in plural opening/closing cycles of the intake valve is calculated as the pressure reduction amount for calculating the excess air amount, and a length of the sampling cycle for the analogue to digital conversion is changed according to a ratio of a length of a pulsation cycle of the pressure to a length of the sampling cycle;

calculating an excess air amount that is an amount of air charged into a cylinder due to the pulsation of the pressure, based on the pressure reduction amount; and estimating the in-cylinder air amount based on the inflow air amount and the excess air amount.

13. The in-cylinder air amount estimation method according to claim 12, wherein when the pressure reduction amount is calculated, the length of the sampling cycle is decreased in a case where the ratio of the length of the pulsation cycle of the pressure to the length of the sampling cycle for the analogue to digital conversion is less than a predetermined level, as compared to a case where the ratio of the length of the pulsation cycle of the pressure to the length of the sampling cycle is equal to or greater than the predetermined level.

14. The in-cylinder air amount estimation method according to claim 13, wherein when the pressure reduction amount is calculated, the length of the sampling cycle is set to a value that is different from a value to which the length of the sampling cycle has been set in a case where it is determined that the ratio of the length of the pulsation cycle of the pressure to the length of the sampling cycle for the analogue to digital conversion is a value which makes a waveform of a change in the pressure in the intake pipe obtained by the quantization during each opening/closing cycle of the intake valve uniform.

15. The in-cylinder air amount estimation method according to claim 12, wherein when the pressure reduction amount is calculated, the length of the sampling cycle is set to a value that is different from a value to which the length of the sampling cycle has been set in a case where it is determined that the ratio of the length of the pulsation cycle of the pressure to the length of the sampling cycle for the analogue to digital conversion is a value which makes a waveform of a change in the pressure in the intake pipe obtained by the quantization during each opening/closing cycle of the intake valve uniform.

16. An in-cylinder air amount estimation method which is applied to an internal combustion engine where pulsation of a pressure occurs in an intake pipe due to opening/closing of an intake valve, and in which an inflow air amount that is an amount of air flowing into the intake pipe is calculated, and an in-cylinder air amount is estimated using the inflow air amount, comprising the steps of:

performing quantization of an output of a pressure sensor for detecting the pressure in the intake pipe using analogue to digital conversion in a predetermined sampling cycle, and calculating a pressure reduction amount that is an amount of reduction in the pressure in the intake pipe due to opening of the intake valve using a value obtained by the quantization as the pressure in the intake pipe, wherein an average value of the pressure reduction amount in plural opening/closing cycles of the intake valve is calculated as the pressure reduction amount for calculating the excess air amount, and the pressure reduction amount in the intake pipe in a present opening/closing cycle is not calculated when it is determined that a ratio of a length of a pulsation cycle of the pressure to a length of the sampling cycle for the analogue to digital conversion is a value which makes a waveform of a change in the pressure in the intake pipe obtained by the quantization during each opening/closing cycle of the intake valve uniform;

calculating an excess air amount that is an amount of air charged into a cylinder due to the pulsation of the pressure, based on the pressure reduction amount; and estimating the in-cylinder air amount based on the inflow air amount and the excess air amount.

* * * * *